US012475840B2

(12) United States Patent
Chu et al.

(10) Patent No.: US 12,475,840 B2
(45) Date of Patent: Nov. 18, 2025

(54) DISPLAY DRIVING DEVICE AND DISPLAY DRIVING METHOD

(71) Applicant: AUO Corporation, Hsinchu (TW)

(72) Inventors: Chia-Hsien Chu, Hsinchu (TW); Chun-Chi Lai, Hsinchu (TW); Ching-Sheng Cheng, Hsinchu (TW)

(73) Assignee: AUO Corporation, Hsinchu (TW)

( * ) Notice: Subject to any disclaimer, the term of this patent is extended or adjusted under 35 U.S.C. 154(b) by 0 days.

(21) Appl. No.: 18/910,030

(22) Filed: Oct. 9, 2024

(65) Prior Publication Data

US 2025/0273127 A1 Aug. 28, 2025

(30) Foreign Application Priority Data

Feb. 26, 2024 (TW) ................................ 113106856

(51) Int. Cl.
*G09G 3/32* (2016.01)

(52) U.S. Cl.
CPC ........... *G09G 3/32* (2013.01); *G09G 2310/04* (2013.01); *G09G 2310/08* (2013.01); *G09G 2330/021* (2013.01)

(58) Field of Classification Search
None
See application file for complete search history.

(56) References Cited

U.S. PATENT DOCUMENTS

2016/0042707 A1 2/2016 Wang et al.
2018/0047342 A1 2/2018 Wang et al.
2018/0197455 A1 7/2018 Han et al.
2020/0258454 A1 8/2020 Wang et al.
2024/0265881 A1 * 8/2024 Song .................... G09G 3/3233

FOREIGN PATENT DOCUMENTS

CN 1617205 A * 5/2005 ........... G09G 3/2022
CN 108037630 A 5/2018
TW 201913634 A 4/2019
TW 202009914 A 3/2020

* cited by examiner

*Primary Examiner* — Ifedayo B Iluyomade
(74) *Attorney, Agent, or Firm* — WPAT, PC

(57) ABSTRACT

A display driving device includes an update area, a first driving circuit and a second driving circuit. The first driving circuit includes a first scan signal generator, a first transistor, a second transistor and a second scan signal generator. The first scan signal generator is configured to output a scan signal. A first terminal of the first transistor is coupled to the first scan signal generator and receives the scan signal. A first control terminal of the first transistor is configured to determine whether to output a scan signal. A second terminal of the second transistor is coupled to the first transistor. The second control terminal of the second transistor is configured to determine whether to output the driving partial signal. The second scan signal generator is configured to receive and output the scan signal according to the scan signal and/or the driving part signal.

16 Claims, 15 Drawing Sheets

DISPLAY DRIVING DEVICE AND DISPLAY DRIVING METHOD

CROSS-REFERENCE TO RELATED APPLICATION

This application claims priority to Taiwan Application Serial Number 113106856, filed Feb. 26, 2024, which is herein incorporated by reference in its entirety.

BACKGROUND

Field of Invention

The present disclosure relates to a driving device and a driving method, and more particularly to a display driving device and a display driving method.

Description of Related Art

Currently, the display device of a watch can only update the entire screen and cannot perform partial screen updates, resulting in increased power consumption and reduced battery life of the watch.

SUMMARY

It is to be understood that both the foregoing general description and the following detailed description are by examples, and are intended to provide further explanation of the invention as claimed.

One technical aspect of the present disclosure relates to a display driving device. The display driving device comprises an update area, a first driving circuit, and a second driving circuit. The first driving circuit includes a first scan signal generator, a first transistor, a second transistor, and a second scan signal generator. The first driving circuit is coupled to the update area. The first scan signal generator is configured to output a scan signal. A first terminal of the first transistor is coupled to the first scan signal generator and receives the scan signal. A first control terminal of the first transistor is configured to determine whether to output the scan signal based on a first control signal. A second terminal of the second transistor is coupled to the first transistor. A second control terminal of the second transistor is configured to determine whether to output a driving partial signal based on a second control signal. The second scan signal generator is configured to receive and output the scan signal based on the scan signal and/or the driving partial signal. The second driving circuit includes a first light-emitting signal generator, a third transistor, a fourth transistor, and a second light-emitting signal generator. The second driving circuit is coupled to the update area. The first light-emitting signal generator is configured to output a light-emitting signal. A third terminal of the third transistor is coupled to the first light-emitting signal generator and receives the light-emitting signal. A third control terminal of the third transistor is configured to determine whether to output the light-emitting signal based on the first control signal. A fourth terminal of the fourth transistor is coupled to the third transistor. A fourth control terminal of the fourth transistor is configured to determine whether to output a light-emitting partial signal based on the second control signal. The second light-emitting signal generator is configured to receive and output the light-emitting signal based on the light-emitting signal and/or the light-emitting partial signal. The first driving circuit is located on a first side of the update area, and the second driving circuit is located on a second side of the update area, with the first side and the second side being different sides.

Another technical aspect of the present disclosure relates to a display driving method. The display driving method comprises the following steps: outputting a scan signal by a first scan signal generator; determining whether to output the scan signal by a first transistor based on a first control signal; determining whether to output a driving partial signal by a second transistor based on a second control signal; outputting the scan signal by a second scan signal generator based on the scan signal and/or the driving partial signal; outputting a light-emitting signal by a first light-emitting signal generator; determining whether to output the light-emitting signal by a third transistor based on the first control signal; determining whether to output a light-emitting partial signal by a fourth transistor based on the second control signal; and outputting the light-emitting signal by a second light-emitting signal generator based on the light-emitting signal and/or the light-emitting partial signal. The first driving circuit is coupled to the update area, and the second driving circuit is coupled to the update area. The first driving circuit comprises the first scan signal generator, the first transistor, the second transistor, and the second scan signal generator. The second driving circuit comprises the first light-emitting signal generator, the third transistor, the fourth transistor, and the second light-emitting signal generator. The first driving circuit is located on a first side of the update area, and the second driving circuit is located on a second side of the update area, with the first side and the second side being different sides.

Thus, according to the present disclosure, the display driving device and display driving method illustrated in embodiments of the present disclosure can achieve the effect of performing partial updates through multiple driving circuits.

Upon reviewing the following embodiments, those skilled in the art can easily understand the basic spirit and other inventive objectives of the present disclosure, as well as the technical means and implementation aspects employed in the present disclosure.

BRIEF DESCRIPTION OF THE DRAWINGS

The present disclosure can be more fully understood by reading the following detailed description of the embodiment, with reference made to the accompanying drawings as follows.

Figure 1:
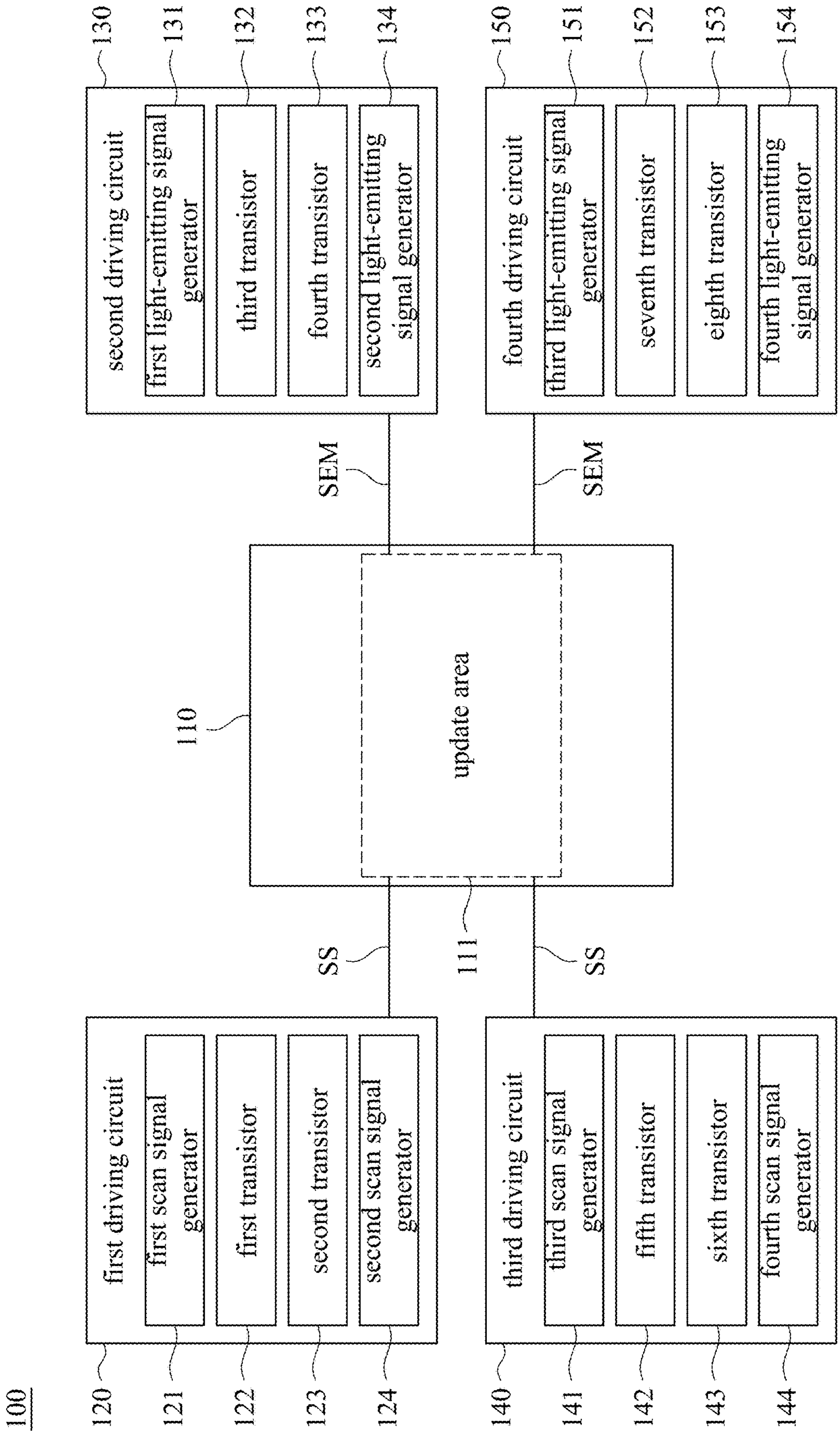
FIG. 1 illustrates a block schematic diagram of a display driving device according to an embodiment of the present disclosure.

In accordance with conventional practices, various features and elements in the figures are not drawn to scale, and the drawing method is intended to best present the specific features and elements related to the present disclosure. Furthermore, similar or identical reference symbols are configured across different figures to denote similar elements/components.

DETAILED DESCRIPTION

Reference will now be made in detail to the present embodiments of the invention, examples of which are illustrated in the accompanying drawings. Wherever possible, the same reference numbers are used in the drawings and the description to refer to the same or like parts.

To make the description of the present disclosure more detailed and complete, the following provides illustrative descriptions of the embodiments and specific examples of the present disclosure; however, this is not the only form of implementing or utilizing the specific embodiments of the present disclosure. The embodiments encompass features of a plurality of specific examples and the method steps and their sequences used to construct and operate these specific examples. However, other specific embodiments can also be used to achieve the same or equivalent functions and step sequences.

Unless otherwise defined in this specification, the meanings of the scientific and technical terms used herein are the same as those understood and commonly used by those with ordinary knowledge in the technical field to which the present disclosure pertains. Furthermore, where the context does not conflict, singular nouns used in this specification include the plural form of the noun; and plural nouns used also include the singular form of the noun.

Additionally, regarding the terms "coupled" or "connected" used herein, they can refer to two or more components being in direct physical or electrical contact with each other, or in indirect physical or electrical contact with each other, and can also refer to two or more components operating or acting in conjunction with each other.

In this document, the term "circuit" broadly refers to an object that processes signals by connecting one or more transistors and/or one or more passive components in a certain manner.

Certain terms are used in the specification and claims to refer to specific components. However, those with ordinary knowledge in the technical field should understand that the same components may be referred to by different names. The specification and claims do not distinguish components by the difference in names but by the difference in their functions. The term "comprising" as mentioned in the specification and claims is an open-ended term, and thus should be interpreted as "including but not limited to."

FIG. 1 is a block schematic diagram illustrating a display driving device according to an embodiment of the present disclosure. As shown in FIG. 1, the display driving device 100 includes a display 110, a first driving circuit 120, a second driving circuit 130, a third driving circuit 140, and a fourth driving circuit 150. The display 110 includes an update area 111. Regarding the coupling relationship, the first driving circuit 120 is coupled to the update area 111, the second driving circuit 130 is coupled to the update area 111, the third driving circuit 140 is coupled to the update area 111, and the fourth driving circuit 150 is coupled to the update area 111.

For example, the display 110 may be any type of light-emitting diode display, such as a micro light-emitting diode (Micro LED) display, a mini light-emitting diode (Mini LED) display, or an organic light-emitting diode (OLED) display, but the present disclosure is not limited to this.

Additionally, the display 110 may perform full-screen updates, and the update area 111 of the display 110 may perform partial screen updates, but the present disclosure is not limited to this.

In some embodiments, the first driving circuit 120 includes a first scan signal generator 121, a first transistor 122, a second transistor 123, and a second scan signal generator 124.

In some embodiments, the second driving circuit 130 includes a first light-emitting signal generator 131, a third transistor 132, a fourth transistor 133, and a second light-emitting signal generator 134.

In some embodiments, the third driving circuit 140 includes a third scan signal generator 141, a fifth transistor 142, a sixth transistor 143, and a fourth scan signal generator 144.

In some embodiments, the fourth driving circuit 150 includes a third light-emitting signal generator 151, a seventh transistor 152, an eighth transistor 153, and a fourth light-emitting signal generator 154.

Figure 2:
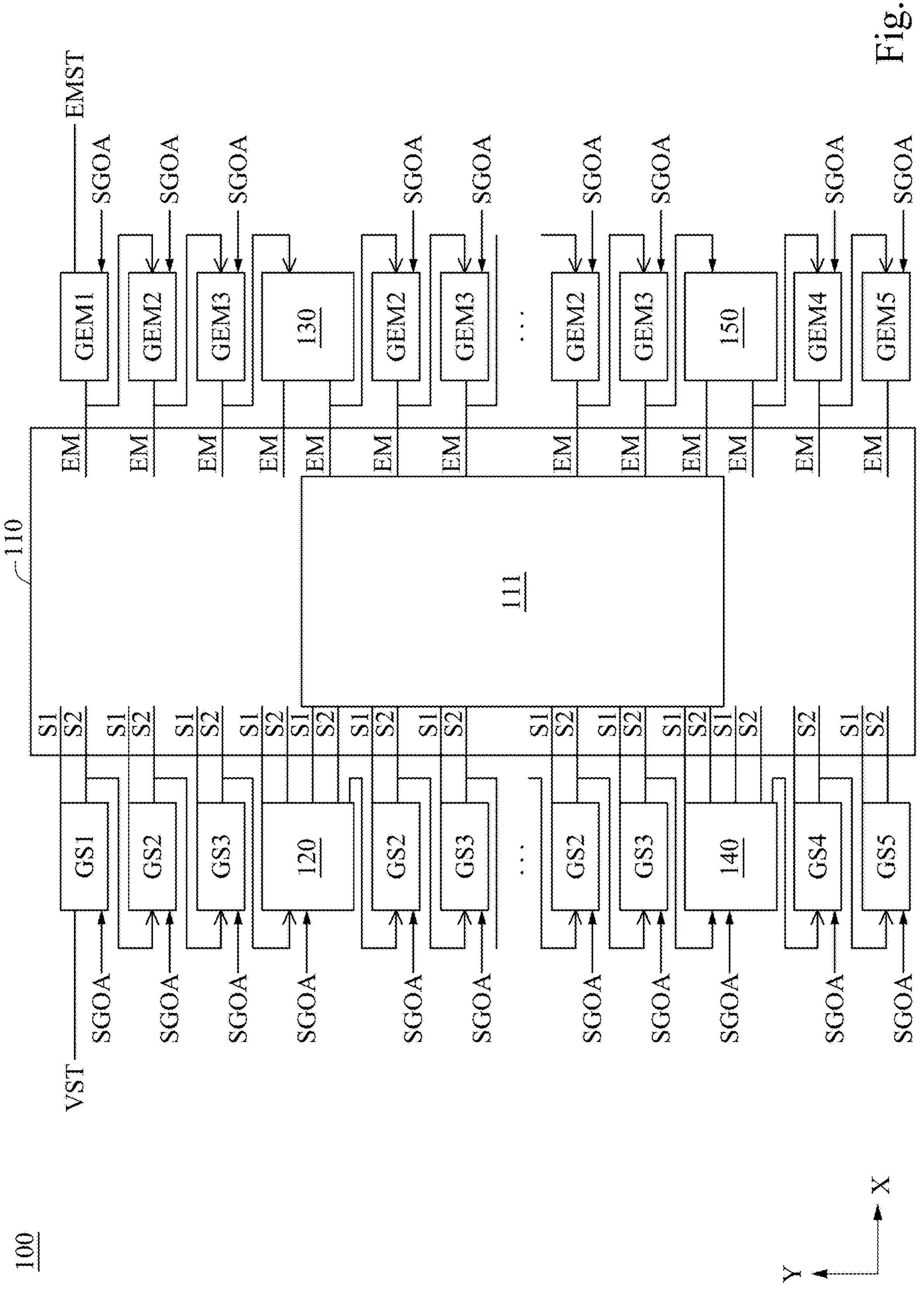
FIG. 2 illustrates a block schematic diagram of a display driving device according to an embodiment of the present disclosure.

FIG. 2 is a block schematic diagram illustrating a display driving device according to an embodiment of the present disclosure. As shown in FIG. 2, the display driving device 100 includes a display 110, an update area 111, a first driving circuit 120, a second driving circuit 130, a third driving circuit 140, a fourth driving circuit 150, a plurality of scan signal generators GS1-GS5, and a plurality of light-emitting signal generators GEM1-GEM5.

For example, the display driving device 100, display 110, update area 111, first driving circuit 120, second driving circuit 130, third driving circuit 140, and fourth driving circuit 150 in FIG. 2 may respectively correspond to the display driving device 100, display 110, update area 111, first driving circuit 120, second driving circuit 130, third driving circuit 140, and fourth driving circuit 150 in FIG. 1, but the present disclosure is not limited to this.

Regarding the coupling relationships, the first driving circuit 120 is coupled to the update area 111, the second driving circuit 130 is coupled to the update area 111, the third driving circuit 140 is coupled to the update area 111, and the fourth driving circuit 150 is coupled to the update area 111. The scan signal generator GS1 is coupled to the scan signal generator GS2, the scan signal generator GS2 is coupled to the scan signal generator GS3, the scan signal generator GS3 is coupled to the first driving circuit 120. The third driving circuit 140 is coupled to the scan signal generator GS4, and the scan signal generator GS4 is coupled to the scan signal generator GS5.

Regarding the coupling relationships, the light-emitting signal generator GEM1 is coupled to the light-emitting signal generator GEM2, the light-emitting signal generator GEM2 is coupled to the light-emitting signal generator GEM3, and the light-emitting signal generator GEM3 is coupled to the second driving circuit 130. The fourth driving circuit 150 is coupled to the light-emitting signal generator GEM4, and the light-emitting signal generator GEM4 is coupled to the light-emitting signal generator GEM5.

In some embodiments, the first driving circuit 120 receives the gate signal SGOA, and the first driving circuit 120 outputs the scan signal S1 and the scan signal S2. The second driving circuit 130 receives the gate signal SGOA, and the second driving circuit 130 outputs the scan signal S1 and the scan signal S2. The third driving circuit 140 receives the gate signal SGOA, and the third driving circuit 140 outputs the scan signal S1 and the scan signal S2. The fourth driving circuit 150 receives the gate signal SGOA, and the fourth driving circuit 150 outputs the scan signal S1 and the scan signal S2.

For example, the scan signal S1 and/or the scan signal S2 in FIG. 2 may correspond to the scan signal SS in FIG. 2, but the present disclosure is not limited thereto.

In some embodiments, the scan signal generator GS1 receives the driving signal VST and the gate signal SGOA, and the scan signal generator GS1 outputs the scan signal S1 and the scan signal S2. The scan signal generator GS2 receives the scan signal S2 and the gate signal SGOA, and the scan signal generator GS2 outputs the scan signal S1 and the scan signal S2. The scan signal generator GS3 receives the scan signal S2 and the gate signal SGOA, and the scan signal generator GS3 outputs the scan signal S1 and the scan signal S2. The scan signal generator GS4 receives the scan signal S2 and the gate signal SGOA, and the scan signal generator GS4 outputs the scan signal S1 and the scan signal S2. The scan signal generator GS5 receives the scan signal S2 and the gate signal SGOA, and the scan signal generator GS5 outputs the scan signal S1 and the scan signal S2.

In some embodiments, the light-emitting signal generator GEM1 receives the light-emitting start signal EMST and the gate signal SGOA, and the light-emitting signal generator GEM1 outputs the light-emitting signal EM. The light-emitting signal generator GEM2 receives the light-emitting signal EM and the gate signal SGOA, and the light-emitting signal generator GEM2 outputs the light-emitting signal EM. The light-emitting signal generator GEM3 receives the light-emitting signal EM and the gate signal SGOA, and the light-emitting signal generator GEM3 outputs the light-emitting signal EM. The light-emitting signal generator GEM4 receives the light-emitting signal EM and the gate signal SGOA, and the light-emitting signal generator GEM4 outputs the light-emitting signal EM. The light-emitting signal generator GEM5 receives the light-emitting signal EM and the gate signal SGOA, and the light-emitting signal generator GEM5 outputs the light-emitting signal EM.

For example, the light-emitting signal EM in FIG. 2 may correspond to the light-emitting signal SEM in FIG. 1, but the present disclosure is not limited thereto.

In some embodiments, the scan signal generator GS1, the scan signal generator GS2, the scan signal generator GS3, the first driving circuit 120, the third driving circuit 140, the scan signal generator GS4, and the scan signal generator GS5 are arranged along a first direction (e.g., Y-axis).

In some embodiments, the light-emitting signal generator GEM1, the light-emitting signal generator GEM2, the light-emitting signal generator GEM3, the second driving circuit 130, the fourth driving circuit 150, the light-emitting signal generator GEM4, and the light-emitting signal generator GEM5 are arranged along the first direction (e.g., Y-axis).

In some embodiments, the first driving circuit 120 and the second driving circuit 130 are arranged along a second direction (e.g., X-axis). The third driving circuit 140 and the fourth driving circuit 150 are arranged along the second direction (e.g., X-axis).

In some embodiments, the update area 111 receives the scan signal S1 and the scan signal S2 from the first driving circuit 120. In some embodiments, the update area 111 receives the light-emitting signal EM from the second driving circuit 130. In some embodiments, the update area 111 receives the scan signal S1 and the scan signal S2 from the third driving circuit 140. In some embodiments, the update area 111 receives the light-emitting signal EM from the fourth driving circuit 150.

In some embodiments, the gate signal SGOA may come from a gate signal generator (GOA generator). In some embodiments, the gate signal SGOA may be a sinusoidal signal, such as an alternating current (AC) signal, but the present disclosure is not limited thereto.

In some embodiments, there are a plurality of scan signal generators GS2 and a plurality of scan signal generators GS3 between the first driving circuit 120 and the third driving circuit 140. The plurality of scan signal generators GS2 respectively output the scan signal S1 and the scan signal S2 to the update area 111. The plurality of scan signal generators GS3 respectively output the scan signal S1 and the scan signal S2 to the update area 111.

In some embodiments, the scan signal generator GS2, the scan signal generator GS3, the scan signal generator GS2, and the scan signal generator GS3 are sequentially coupled between the first driving circuit 120 and the third driving circuit 140.

In some embodiments, there are a plurality of light-emitting signal generators GEM2 and a plurality of light-emitting signal generators GEM3 between the second driving circuit 130 and the fourth driving circuit 150. The plurality of light-emitting signal generators GEM2 respectively output the light-emitting signal EM to the update area 111. The plurality of light-emitting signal generators GEM3 respectively output the light-emitting signal EM to the update area 111.

In some embodiments, the light-emitting signal generator GEM2, the light-emitting signal generator GEM3, the light-emitting signal generator GEM2, and the light-emitting signal generator GEM3 are sequentially coupled between the second driving circuit 130 and the fourth driving circuit 150.

Figure 3A:
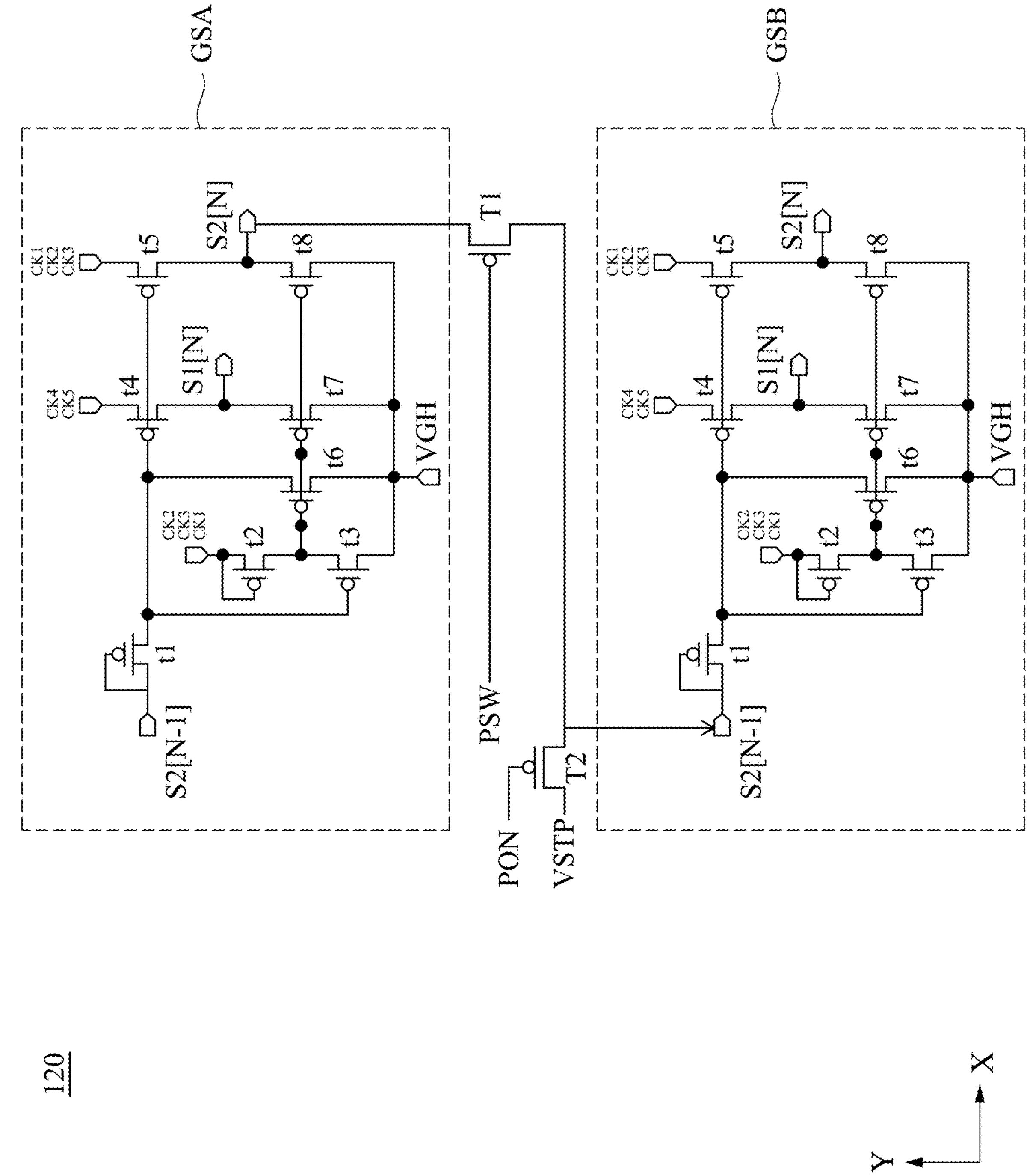
FIG. 3A illustrates a detailed circuit diagram of a display driving device according to an embodiment of the present disclosure.

FIG. 3A illustrates a detailed circuit diagram of a display driving device according to an embodiment of the present application. As shown in FIG. 3A, in some embodiments, the first driving circuit 120 includes a scan signal generator GSA, transistor T1, transistor T2, and scan signal generator GSB.

For example, the first driving circuit 120, scan signal generator GSA, transistor T1, transistor T2, and scan signal generator GSB of FIG. 3A may correspond to the first driving circuit 120, the first scan signal generator 121, first transistor 122, second transistor 123, and second scan signal generator 124 of FIG. 1, respectively, but the present disclosure is not limited thereto.

In some embodiments, the scan signal generator GSA includes a plurality of transistors t1 to t8.

In this embodiment, one terminal of transistor t1 receives the scan signal S2[N−1], the control terminal of transistor t1 receives the scan signal S2[N−1], and the other terminal of transistor t1 is coupled to transistor t3. One terminal of transistor t2 receives a plurality of clock signals CK1, CK2, CK3, the control terminal of transistor t2 receives a plurality of clock signals CK1, CK2, CK3, and the other terminal of transistor t2 is coupled to transistor t3. One terminal of transistor t3 is coupled to transistor t2, the control terminal of transistor t3 is coupled to transistor t1, and the other terminal of transistor t3 receives the signal VGH.

In this embodiment, one terminal of transistor t4 receives clock signals CK4, CK5, the control terminal of transistor t4 is coupled to transistor t1, and the other terminal of transistor t4 outputs the scan signal S1[N]. One terminal of transistor t5 receives clock signals CK1, CK2, CK3, the control terminal of transistor t5 is coupled to transistor t4, and the other terminal of transistor t5 outputs the scan signal S2[N]. One terminal of transistor t6 is coupled to transistor t4, the control terminal of transistor t6 is coupled to transistor t2, and the other terminal of transistor t6 receives the signal VGH. One terminal of transistor t7 outputs the scan signal S1[N], the control terminal of transistor t7 is coupled to transistor t6, and the other terminal of transistor t7 receives the signal VGH. Transistor t8 outputs the scan signal S2[N], the control terminal of transistor t8 is coupled to transistor t7, and the other terminal of transistor t8 receives the signal VGH.

In some embodiments, one terminal of transistor T1 is coupled to the other terminal of transistor t8, one terminal of transistor T1 receives the scan signal S2[N], the control terminal of transistor T1 receives the control signal PSW, and the other terminal of transistor T1 is coupled to transistor T2. One terminal of transistor T2 is coupled to transistor T1, the control terminal of transistor T2 receives the control signal PON, and the other terminal of transistor T2 receives the driving partial signal VSTP.

In some embodiments, one terminal of transistor T2 is coupled to the scan signal generator GSB, and one terminal of transistor T2 outputs the scan signal S2[N−1].

In some embodiments, the structure and operation of the scan signal generator GSB are similar to those of the scan signal generator GSA. To simplify the description, other operations of the scan signal generator GSB are omitted here.

Figure 3B:
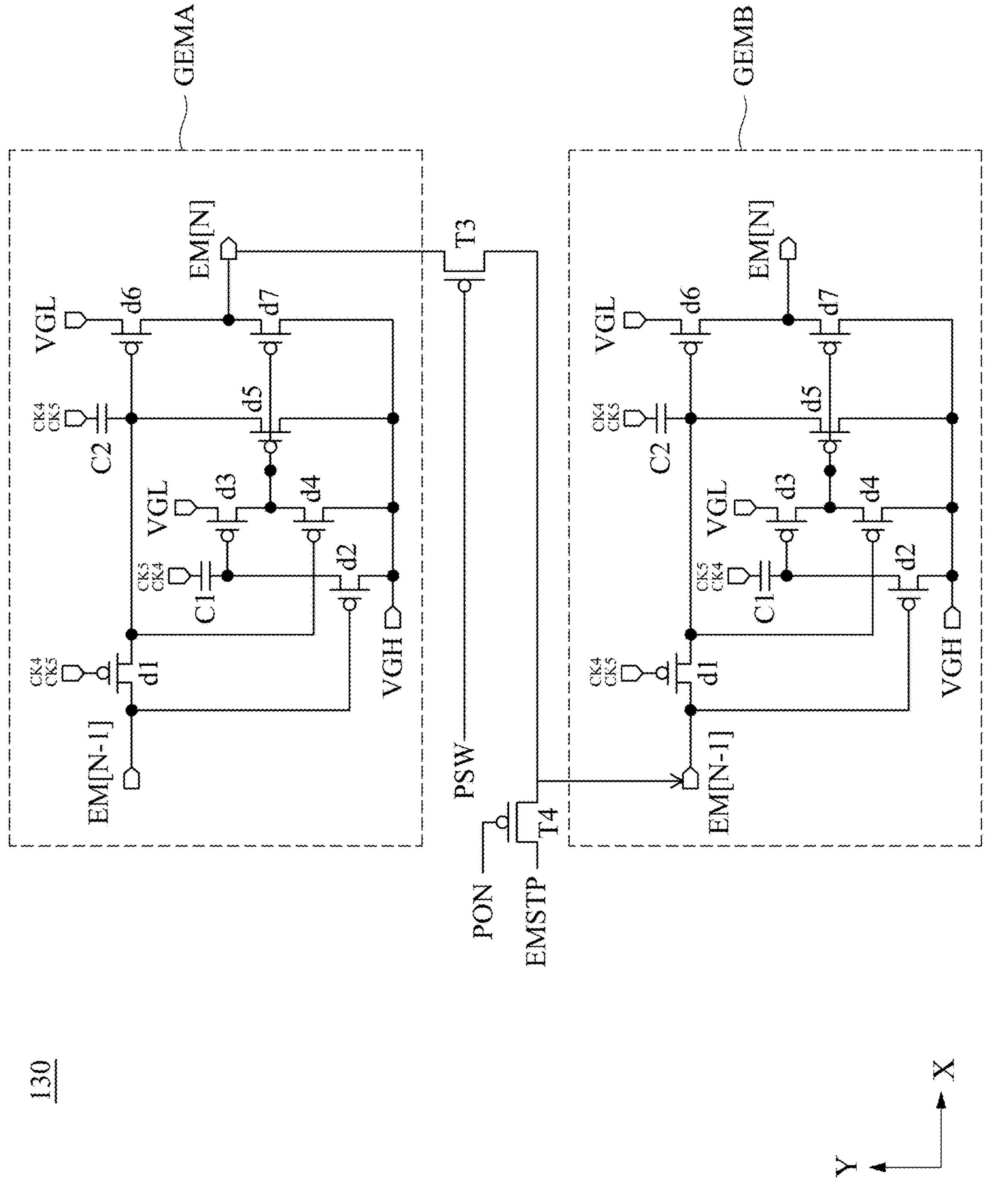
FIG. 3B illustrates a detailed circuit diagram of a display driving device according to an embodiment of the present disclosure.

FIG. 3B illustrates a detailed circuit diagram of a display driving device according to an embodiment of the present application. As shown in FIG. 3B, in some embodiments, the second driving circuit 130 includes a first light-emitting signal generator GEMA, transistor T3, transistor T4, and a second light-emitting signal generator GEMB.

For example, the second driving circuit 130, the first light-emitting signal generator GEMA, transistor T3, transistor T4, and the second light-emitting signal generator GEMB of FIG. 3B may correspond to the second driving circuit 130, first light-emitting signal generator 131, third transistor 132, fourth transistor 133, and second light-emitting signal generator 134 of FIG. 1, respectively, but the present disclosure is not limited thereto.

In some embodiments, the first light-emitting signal generator GEMA includes a plurality of transistors d1 to d7. One terminal of transistor d1 receives the light-emitting signal EM[N−1], the control terminal of transistor d1 receives clock signals CK4, CK5, and the other terminal of transistor d1 is coupled to transistor d4. One terminal of capacitor C1 receives clock signals CK4, CK5, and the other terminal of capacitor C1 is coupled to transistor d2. One terminal of transistor d2 is coupled to capacitor C1, the control terminal of transistor d2 receives the light-emitting signal EM[N−1], and the other terminal of transistor d2 receives the signal VGH.

In this embodiment, one terminal of transistor d3 receives the signal VGL, the control terminal of transistor d3 is coupled to capacitor C1, and the other terminal of transistor d3 is coupled to transistor d4. One terminal of transistor d4 is coupled to transistor d3, the control terminal of transistor d4 is coupled to transistor d1, and the other terminal of transistor d4 receives the signal VGH. One terminal of capacitor C2 receives clock signals CK4, CK5, and the other terminal of capacitor C2 is coupled to transistor d5. One terminal of transistor d5 is coupled to capacitor C2, the control terminal of transistor d5 is coupled to transistor d3, and the other terminal of transistor d5 receives the signal VGH.

In this embodiment, one terminal of transistor t6 receives the signal VGL, the control terminal of transistor t6 is coupled to transistor d1, and the other terminal of transistor t6 outputs the light-emitting signal EM[N]. One terminal of transistor t7 outputs the light-emitting signal EM[N], the control terminal of transistor t7 is coupled to transistor t5, and the other terminal of transistor t7 receives the signal VGH.

In some embodiments, one terminal of transistor T3 is coupled to one terminal of transistor d7, one terminal of transistor T3 receives the light-emitting signal EM[N], the control terminal of transistor T3 receives the control signal PSW, and the other terminal of transistor T3 is coupled to transistor T4. One terminal of transistor T4 is coupled to transistor T3, the control terminal of transistor T4 receives the control signal PON, and the other terminal of transistor T4 receives the light-emitting partial signal EMSTP.

In some embodiments, one terminal of transistor T4 is coupled to the second light-emitting signal generator GEMB, and one terminal of transistor T4 outputs the light-emitting scan signal EM[N−1].

In some embodiments, the structure and operation of the second light-emitting signal generator GEMB are similar to those of the first light-emitting signal generator GEMA. To simplify the description, other operations of the second light-emitting signal generator GEMB are omitted here.

Figure 3C:
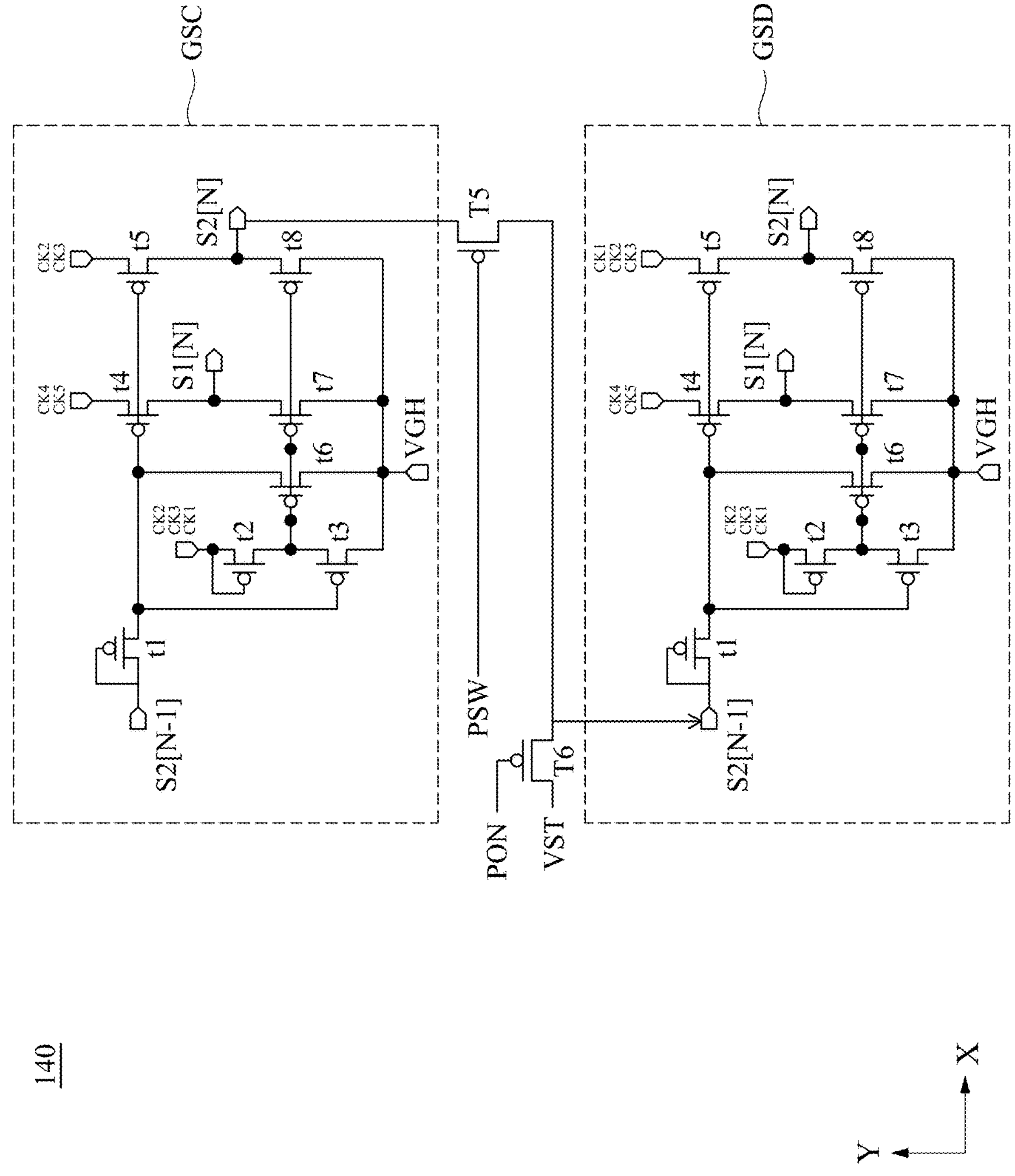
FIG. 3C illustrates a detailed circuit diagram of a display driving device according to an embodiment of the present disclosure.

FIG. 3C illustrates a detailed circuit diagram of a display driving device according to an embodiment of the present application. As shown in FIG. 3C, in some embodiments, the third driving circuit 140 includes a scan signal generator GSC, a transistor T5, a transistor T6, and a scan signal generator GSD.

For example, the third driving circuit 140, the scan signal generator GSC, the transistor T5, the transistor T6, and the scan signal generator GSD in FIG. 3C correspond to the third driving circuit 140, the third scan signal generator 141, the fifth transistor 142, the sixth transistor 143, and the fourth scan signal generator 144 in FIG. 1, respectively, but the disclosure is not limited thereto.

In some embodiments, the structure and operation of the third driving circuit 140 in FIG. 3C are similar to the structure and operation of the first driving circuit 120 in FIG. 3A. To simplify the description, other operations of the third driving circuit 140 are omitted here. Furthermore, the structure and operation of the scan signal generator GSC are similar to those of the scan signal generator GSA, and the structure and operation of the scan signal generator GSD are similar to those of the scan signal generator GSB.

It should be particularly noted that the transistor T6 receives a driving signal VST, and the driving signal VST is different from the driving partial signal VSTP.

Figure 3D:
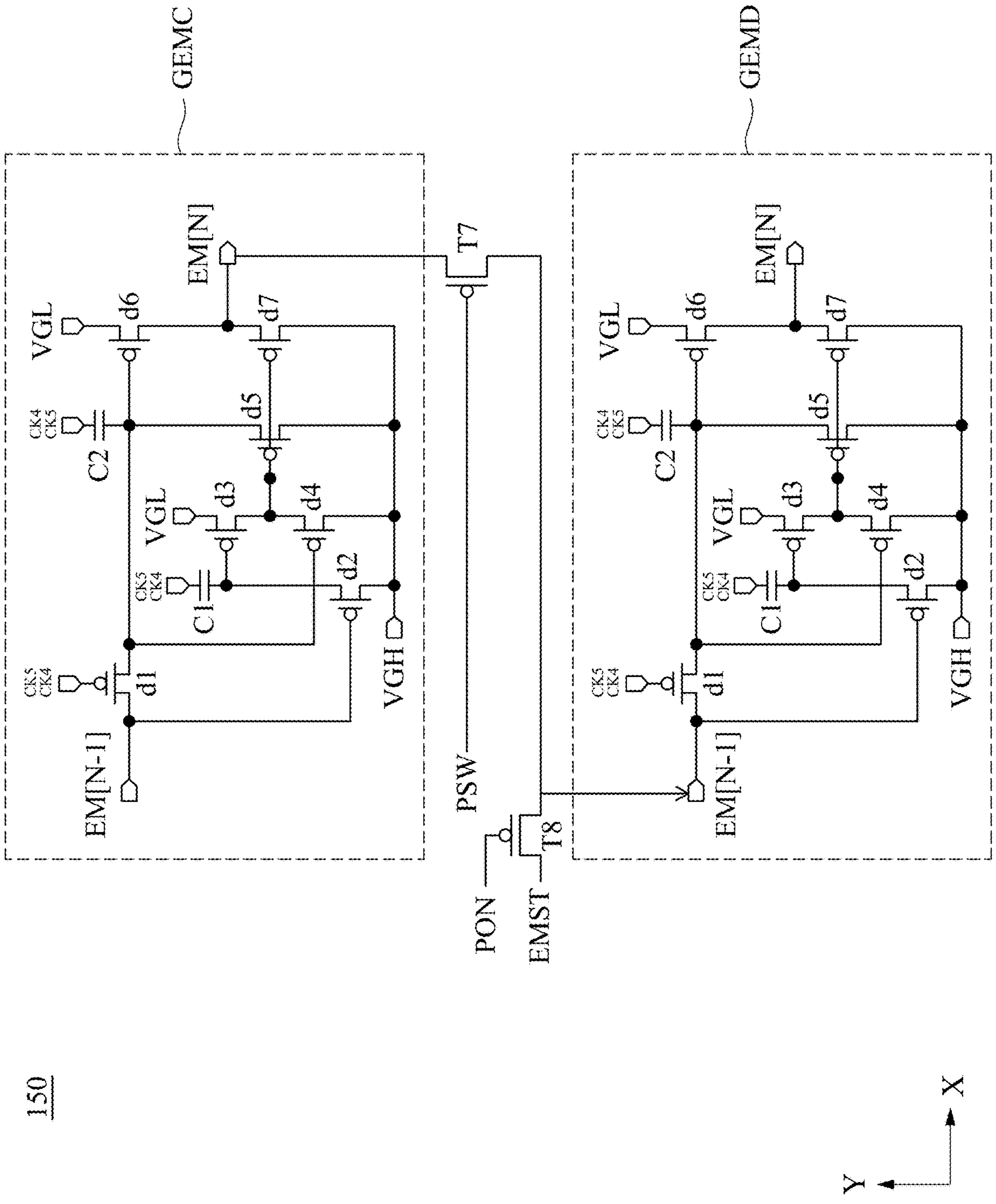
FIG. 3D illustrates a detailed circuit diagram of a display driving device according to an embodiment of the present disclosure.

FIG. 3D illustrates a detailed circuit diagram of a display driving device according to an embodiment of the present disclosure. As shown in FIG. 3D, in some embodiments, the fourth driving circuit 150 includes a third light-emitting signal generator GEMC, a transistor T7, a transistor T8, and a fourth light-emitting signal generator GEMD.

For example, the fourth driving circuit 150, the third light-emitting signal generator GEMC, the transistor T7, the transistor T8, and the fourth light-emitting signal generator GEMD in FIG. 3D may correspond to the fourth driving circuit 150, the third light-emitting signal generator 151, the seventh transistor 152, the eighth transistor 153, and the fourth light-emitting signal generator 154 in FIG. 1, respectively, but the disclosure is not limited thereto.

In some embodiments, the structure and operation of the fourth driving circuit 150 in FIG. 3D are similar to the structure and operation of the second driving circuit 130 in FIG. 3B. To simplify the description, other operations of the fourth driving circuit 150 are omitted here. Furthermore, the structure and operation of the scan signal generator GSC are similar to those of the scan signal generator GSA, and the structure and operation of the scan signal generator GSD are similar to those of the scan signal generator GSB.

It should be particularly noted that the transistor T8 receives a light-emitting start signal EMST, and the light-emitting start signal EMST is different from the light-emitting partial signal EMSTP.

In some embodiments, the transistors T1, T2, T3, T4, T5, T6, T7, and T8 may be of the same type. For example, the transistors T1, T2, T3, T4, T5, T6, T7, and T8 may be any type of p-type transistor, such as a p-type Thin-Film Transistor (TFT) or a p-type Metal Oxide Semiconductor Field Effect Transistor (MOSFET), but the disclosure is not limited thereto.

In some embodiments, the transistors T1, T2, T3, T4, T5, T6, T7, and T8 may be of different types.

Figure 4:
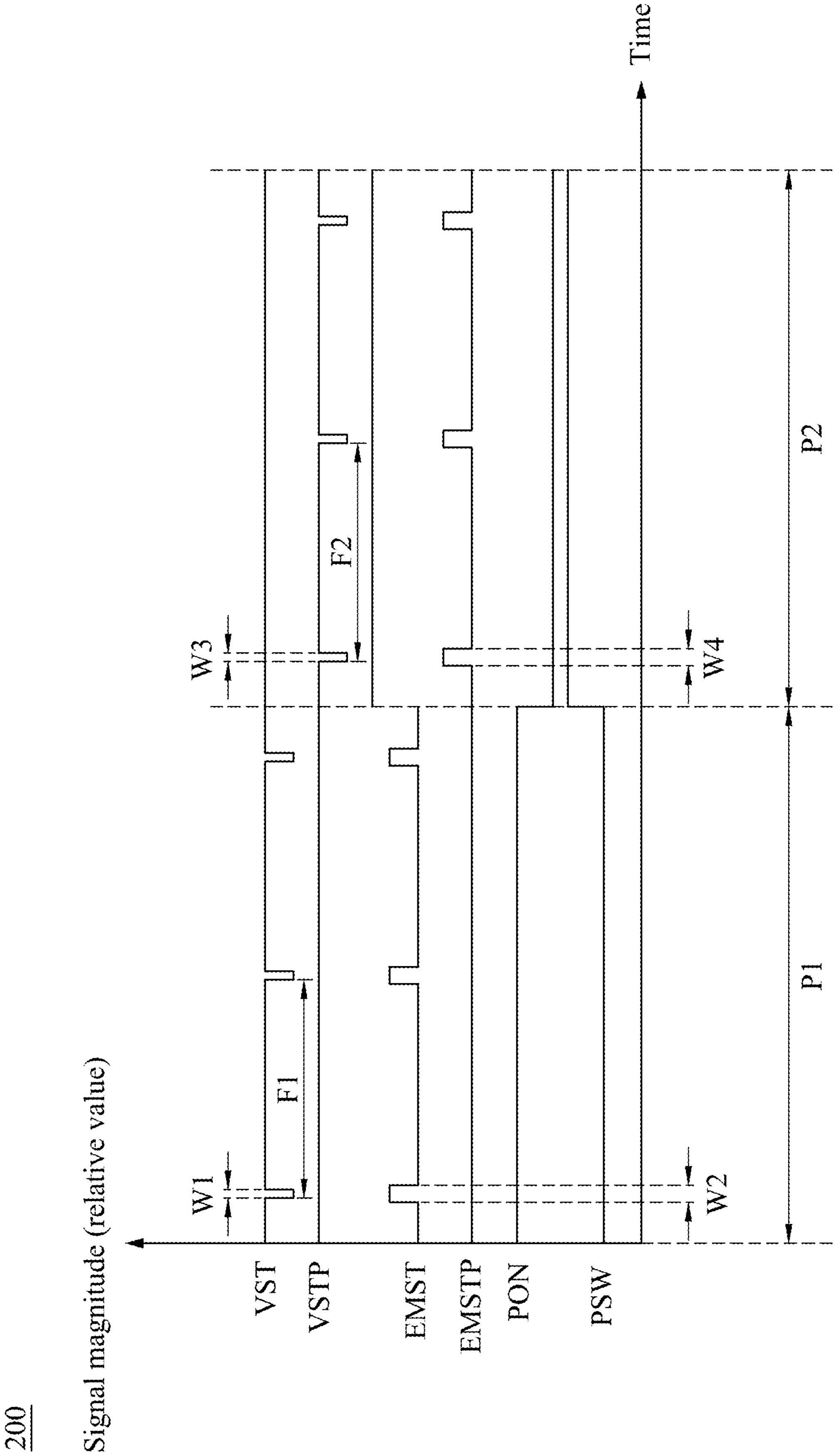
FIG. 4 illustrates a timing diagram of multiple signals of a display driving device according to an embodiment of the present disclosure.

FIG. 4 illustrates a timing diagram of a plurality of signals of a display driving device according to an embodiment of the present disclosure. As shown in FIG. 4, in some embodiments, the timing diagram 200 includes a driving signal VST, a driving partial signal VSTP, a light-emitting start signal EMST, a light-emitting partial signal EMSTP, a control signal PON, a control signal PSW, a period P1, and a period P2.

For example, the driving signal VST, the driving partial signal VSTP, the light-emitting start signal EMST, the light-emitting partial signal EMSTP, the control signal PON, and the control signal PSW in FIG. 4 may correspond to the driving signal VST, the driving partial signal VSTP, the light-emitting start signal EMST, the light-emitting partial signal EMSTP, the control signal PON, and the control signal PSW in FIGS. 3A to 3D, respectively, but the disclosure is not limited thereto.

In some embodiments, during the period P1, the driving signal VST has a plurality of pulse signals.

For example, the pulse signals of the driving signal VST may have a pulse width W1, and the interval between two pulse signals may have a pulse width F1, where the pulse width F1 may be one frame, but the disclosure is not limited thereto. In some embodiments, the length of the pulse width W1 is less than the length of the pulse width F1. For example, one pulse width F1 may equal 15 pulse widths W1, but the disclosure is not limited thereto.

In this embodiment, during the period P1, the driving partial signal VSTP has a constant voltage level signal.

For example, the driving partial signal VSTP may be a high-level signal, such as 5 volts (V), but the disclosure is not limited thereto. In some embodiments, the driving partial signal VSTP may be a low-level signal or grounded, such as −3 V or 0 V, but the disclosure is not limited thereto.

In this embodiment, during the period P1, the light-emitting start signal EMST has a plurality of pulse signals.

For example, the pulse signals of the light-emitting start signal EMST may have a pulse width W2, and the interval between two pulse signals may have a pulse width F1, where the pulse width F1 may be one frame, but the disclosure is not limited thereto. In some embodiments, the length of the pulse width W2 is less than the length of the pulse width F1. For example, one pulse width F1 may equal 10 pulse widths W2, but the disclosure is not limited thereto. In some embodiments, the length of the pulse width W2 is greater than the length of the pulse width W1. In some embodiments, the length of the pulse width W2 equals the length of the pulse width W1.

In this embodiment, during the period P1, the light-emitting partial signal EMSTP has a constant voltage level signal.

For example, the driving partial signal VSTP may be a low-level signal or grounded, such as −3 V or 0 V, but the disclosure is not limited thereto. In some embodiments, the driving partial signal VSTP may be a high-level signal, such as 5 V, but the disclosure is not limited thereto.

In this embodiment, during the period P1, the control signal PON has a constant voltage level signal.

For example, the control signal PON may be a high-level signal, such as 5 V, but the disclosure is not limited thereto.

In this embodiment, during the period P1, the control signal PSW has a constant voltage level signal.

For example, the control signal PSW may be a low-level signal or grounded, such as −5 V or 0 V, but the disclosure is not limited thereto.

In some embodiments, the period P1 may be a full update period for the display, but the disclosure is not limited thereto.

In some embodiments, during the period P2, the driving signal VST has a constant voltage level signal.

For example, the driving signal VST may have a high-level signal, such as 5 V, but the disclosure is not limited thereto.

In this embodiment, during the period P2, the driving partial signal VSTP has a plurality of pulse signals.

For example, the pulse signals of the driving partial signal VSTP may have a pulse width W3, and the interval between two pulse signals may have a pulse width F2, where the pulse width F1 may be one frame, but the disclosure is not limited thereto. In some embodiments, the length of the pulse width W3 is less than the length of the pulse width F1.

For example, one pulse width F1 may equal 15 pulse widths W3, but the disclosure is not limited thereto.

In this embodiment, during the period P1, the light-emitting start signal EMST has a constant voltage level signal.

For example, the light-emitting start signal EMST may have a high-level signal, such as 5 V, but the disclosure is not limited thereto.

In this embodiment, during the period P2, the light-emitting partial signal EMSTP has a plurality of pulse signals.

For example, the pulse signals of the light-emitting partial signal EMSTP may have a pulse width W4, and the interval between two pulse signals may have a pulse width F1, where the pulse width F1 may be one frame, but the disclosure is not limited thereto. In some embodiments, the length of the pulse width W4 is less than the length of the pulse width F1. For example, one pulse width F1 may equal 10 pulse widths W4, but the disclosure is not limited thereto. In some embodiments, the length of the pulse width W4 is greater than the length of the pulse width W3. In some embodiments, the length of the pulse width W4 equals the length of the pulse width W3.

In this embodiment, during the period P2, the control signal PON has a constant voltage level signal.

For example, the control signal PON may be a low-level signal or grounded, such as −3 V or 0 V, but the disclosure is not limited thereto.

In this embodiment, during the period P2, the control signal PSW has a constant voltage level signal.

For example, the control signal PSW may be a high-level signal, such as 5 V, but the disclosure is not limited thereto.

In some embodiments, the period P2 may be a partial update period for the display, but the disclosure is not limited thereto.

Please refer to FIGS. 1 to 4. In one embodiment, a display driving device 100 includes an update area 111, a first driving circuit 120, and a second driving circuit 130. The first driving circuit 120 comprises a first scan signal generator 121, a first transistor 122, a second transistor 123, and a second scan signal generator 124. The second driving circuit 130 comprises a first light-emitting signal generator 131, a third transistor 132, a fourth transistor 133, and a second light-emitting signal generator 134. The first driving circuit 120 is coupled to the update area 111. The second driving circuit 130 is coupled to the update area 111.

In this embodiment, the first scan signal generator GSA (as shown in FIG. 3A) is configured to output a scan signal S2[N]. The first terminal of the first transistor T1 is coupled to the first scan signal generator GSA and receives the scan signal S2[N]. The first control terminal of the first transistor T1 is configured to determine whether to output the scan signal S2[N] based on a first control signal PSW. The second terminal of the second transistor T2 is coupled to the first transistor T1. The second control terminal of the second transistor T2 is configured to determine whether to output a driving partial signal VSTP based on a second control signal PON. The second scan signal generator GSB is configured to receive and output the scan signal S2[N] or S2[N−1] based on the scan signal S2[N] and/or the driving partial signal VSTP.

In this embodiment, the first light-emitting signal generator GEMA (as shown in FIG. 3B) is configured to output a light-emitting signal EM[N]. The third terminal of the third transistor T3 is coupled to the first light-emitting signal generator GEMA and receives the light-emitting signal EM[N]. The third control terminal of the third transistor T3 is configured to determine whether to output the light-emitting signal EM[N] based on the first control signal PSW. The fourth terminal of the fourth transistor T4 is coupled to the third transistor T3. The fourth control terminal of the fourth transistor T4 is configured to determine whether to output a light-emitting partial signal EMSTP based on the second control signal PON. The second light-emitting signal generator GEMB is configured to receive and output the light-emitting signal EM[N] or EM[N−1] based on the light-emitting signal EM[N] and/or the light-emitting partial signal EMSTP.

In this embodiment, the first driving circuit 120 is located on a first side of the update area 111, and the second driving circuit 130 is located on a second side of the update area, with the first side and the second side being different sides from each other.

For example, as shown in FIGS. 1 and 2, the first side may be the left side, and the second side may be the right side, but the present disclosure is not limited thereto. In some embodiments, the first side and the second side may be the same side.

In some embodiments, the first driving circuit 120 may be located on the upper side, lower side, left side, or right side of the update area 111, and the second driving circuit 130 may be located on the lower side, upper side, right side, or left side of the update area.

In one embodiment, the display driving device 100 further includes a third driving circuit 140. The third driving circuit 140 (as shown in FIG. 3C) comprises a third scan signal generator GSC, a fifth transistor T5, a sixth transistor T6, and a fourth scan signal generator GSD. The third driving circuit 140 is coupled to the update area 111.

In this embodiment, the third scan signal generator GSC is configured to output a scan signal S2[N]. The fifth terminal of the fifth transistor T5 is coupled to the third scan signal generator GSC and receives the scan signal S2[N]. The fifth control terminal of the fifth transistor T5 is configured to determine whether to output the scan signal S2[N] based on the first control signal PSW. The sixth terminal of the sixth transistor T6 is coupled to the fifth transistor T5, and the sixth control terminal of the sixth transistor T6 is configured to determine whether to output a driving signal VST based on the second control signal PON. The fourth scan signal generator GSD is configured to receive and output the scan signal S2[N] or S2[N−1] based on the scan signal S2[N] and/or the driving signal VST.

For example, the fourth scan signal generator GSD may output the driving signal VST or the scan signal S2[N] or S2[N−1] based on the scan signal S2[N] and/or the driving signal VST, but the present disclosure is not limited thereto.

In this embodiment, the third driving circuit 140 is located on the first side of the update area 111.

For example, the third driving circuit 140 may be located on the left side of the update area 111, and the third driving circuit 140 may be located on the same side as the first driving circuit 120, but the present disclosure is not limited thereto.

In one embodiment, the display driving device 100 further includes a fourth driving circuit 150. The fourth driving circuit 150 (as shown in FIG. 3D) comprises a third light-emitting signal generator GEMC, a seventh transistor T7, an eighth transistor T8, and a fourth light-emitting signal generator GEMD. The fourth driving circuit 150 is coupled to the update area 111. The third light-emitting signal generator GEMC is configured to output a light-emitting signal EM[N].

In this embodiment, the seventh terminal of the seventh transistor T7 is coupled to the third light-emitting signal generator GEMC and receives the light-emitting signal EM[N]. The seventh control terminal of the seventh transistor T7 is configured to determine whether to output the light-emitting signal EM[N] based on the first control signal PSW. The eighth terminal of the eighth transistor T8 is coupled to the seventh transistor T7. The eighth control terminal of the eighth transistor T8 is configured to determine whether to output a light-emitting activation signal EMST based on the second control signal PON. The fourth light-emitting signal generator GEMD is configured to receive and output the light-emitting signal EM[N] or EM[N−1]based on the light-emitting signal EM[N] and/or the light-emitting activation signal EMST.

In this embodiment, the fourth driving circuit 150 is located on the second side of the update area 111.

For example, the fourth driving circuit 150 is located on the right side of the update area 111, and the fourth driving circuit 150 may be located on the same side as the second driving circuit 130, but the present disclosure is not limited thereto.

In some embodiments, during period P2, the transistor T1 is turned off according to the control signal PSW and stops outputting the scan signal S2[N], while the transistor T2 is turned on according to the control signal PON and outputs the driving partial signal VSTP to the second scan signal generator GSB.

In some embodiments, during period P2, the transistor T3 is turned off according to the control signal PSW and stops outputting the light-emitting signal EM[N], while the transistor T4 is turned on according to the control signal PON and outputs the light-emitting partial signal EMSTP to the second light-emitting signal generator GEMB.

In some embodiments, during period P2, the transistor T5 is turned off according to the control signal PSW and stops outputting the scan signal S2[N], while the transistor T6 is turned on according to the control signal PON and outputs the driving signal VST to the fourth scan signal generator GSD.

In some embodiments, during period P2, the transistor T7 is turned off according to the control signal PSW and stops outputting the light-emitting signal EM[N], while the transistor T8 is turned on according to the control signal PON and outputs the light-emitting activation signal EMST to the fourth light-emitting signal generator GEMD.

Figure 5A:
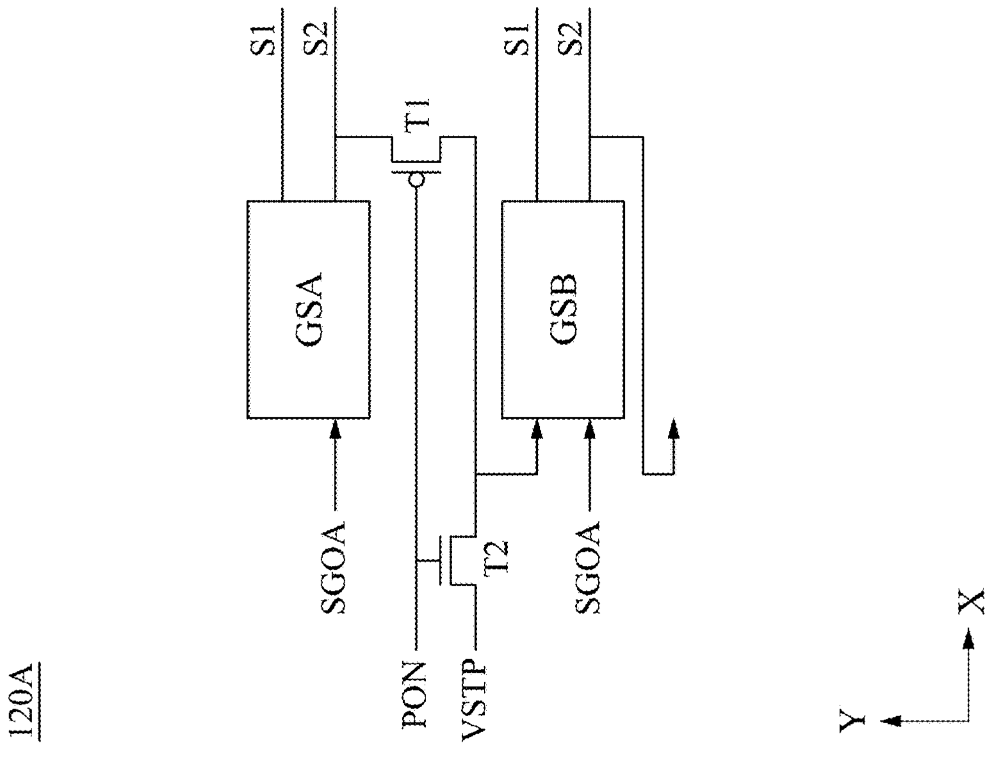
FIG. 5A illustrates an operation scenario diagram of a display driving device according to an embodiment of the present disclosure.

FIG. 5A illustrates an operation scenario of a display driving device according to an embodiment of the present case. As shown in FIG. 5A, in some embodiments, the first driving circuit 120A includes a scan signal generator GSA, a transistor T1, a transistor T2, and a scan signal generator GSB.

For example, the structure and operation of the first driving circuit 120A in FIG. 5A are similar to the structure and operation of the first driving circuit 120 in FIG. 3A. To simplify the description, other operations of the first driving circuit 120A are omitted here.

It should be noted that the control terminal of the transistor T1 and the control terminal of the transistor T2 are coupled to each other. The control terminal of the transistor T1 receives the control signal PON, and the control terminal of the transistor T2 receives the control signal PON, but the present disclosure is not limited thereto.

Figure 5B:
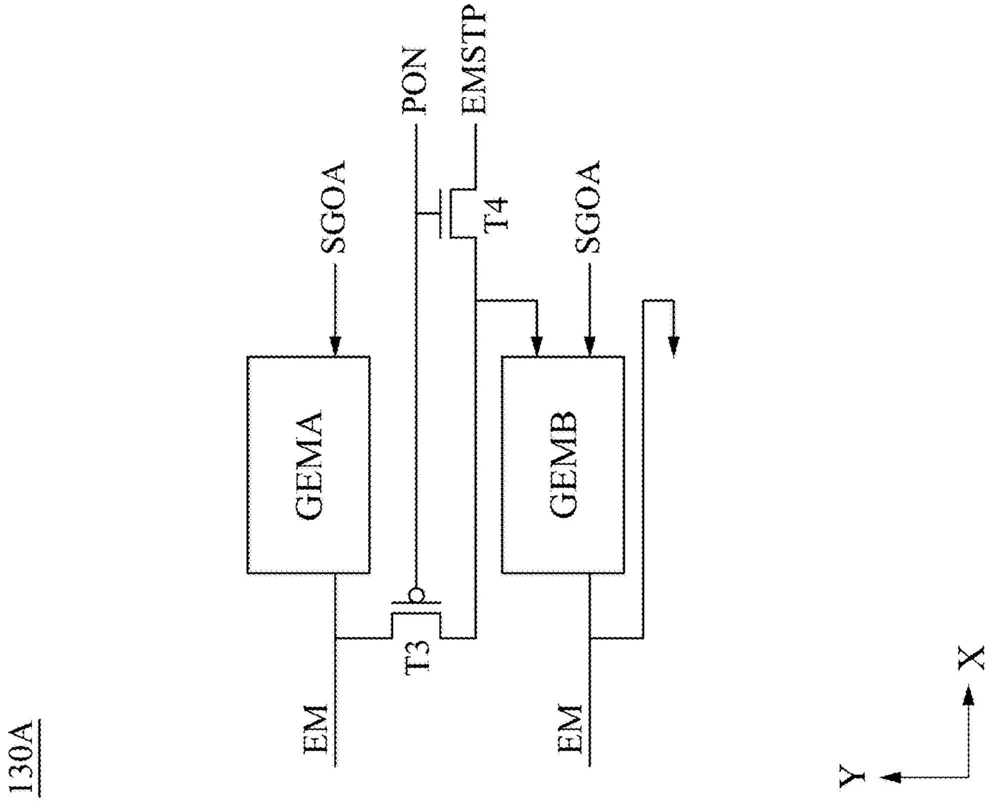
FIG. 5B illustrates an operation scenario diagram of a display driving device according to an embodiment of the present disclosure.

FIG. 5B illustrates an operation scenario of a display driving device according to an embodiment of the present case. As shown in FIG. 5B, in some embodiments, the second driving circuit 130A includes a first light-emitting signal generator GEMA, a transistor T3, a transistor T4, and a second light-emitting signal generator GEMB.

For example, the structure and operation of the second driving circuit 130A in FIG. 5B are similar to the structure and operation of the second driving circuit 130 in FIG. 3B. To simplify the description, other operations of the second driving circuit 130A are omitted here.

It should be noted that the control terminal of the transistor T3 and the control terminal of the transistor T4 are coupled to each other. The control terminal of the transistor T3 receives the control signal PON, and the control terminal of the transistor T4 receives the control signal PON, but the present disclosure is not limited thereto.

Figure 5C:
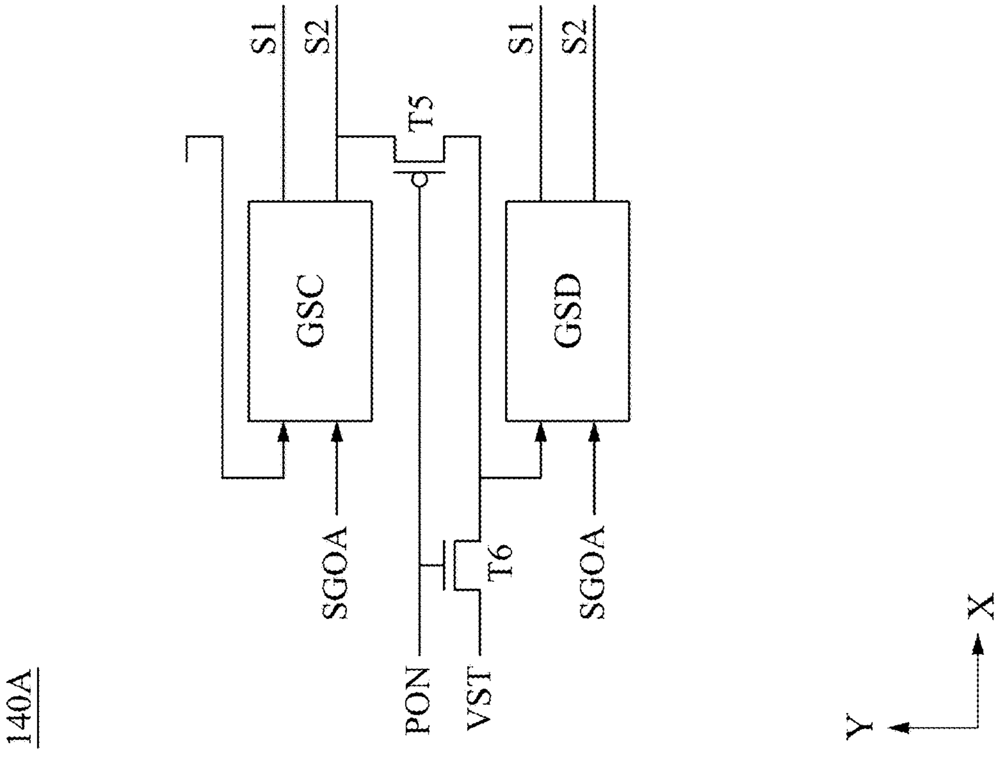
FIG. 5C illustrates an operation scenario diagram of a display driving device according to an embodiment of the present disclosure.

FIG. 5C illustrates an operation scenario of a display driving device according to an embodiment of the present disclosure. As shown in FIG. 5C, in some embodiments, the third driving circuit 140A includes a scan signal generator GSC, a transistor T5, a transistor T6, and a scan signal generator GSD.

For example, the structure and operation of the third driving circuit 140A in FIG. 5C are similar to the structure and operation of the third driving circuit 140 in FIG. 3C. To simplify the description, other operations of the third driving circuit 140A are omitted here.

It should be noted that the control terminal of the transistor T5 and the control terminal of the transistor T6 are coupled to each other. The control terminal of the transistor T5 receives the control signal PON, and the control terminal of the transistor T6 receives the control signal PON, but the present disclosure is not limited thereto.

Figure 5D:
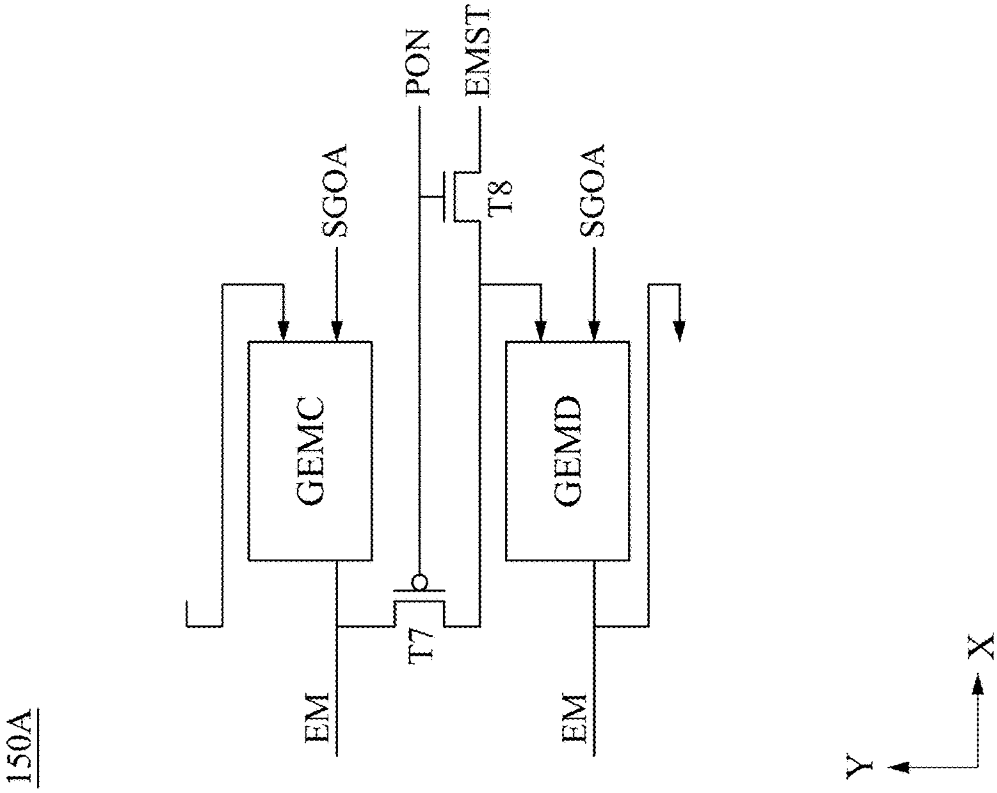
FIG. 5D illustrates an operation scenario diagram of a display driving device according to an embodiment of the present disclosure.

FIG. 5D illustrates an operation scenario of a display driving device according to an embodiment of the present disclosure. As shown in FIG. 5D, in some embodiments, the fourth driving circuit 150A includes a third light-emitting signal generator GEMC, a transistor T7, a transistor T8, and a fourth light-emitting signal generator GEMD.

For example, the structure and operation of the fourth driving circuit 150A in FIG. 5D are similar to the structure and operation of the fourth driving circuit 150 in FIG. 3D. To simplify the description, other operations of the fourth driving circuit 150A are omitted here.

It should be noted that the control terminal of the transistor T7 and the control terminal of the transistor T8 are coupled to each other. The control terminal of the transistor T7 receives the control signal PON, and the control terminal of the transistor T8 receives the control signal PON, but the present disclosure is not limited thereto.

Figure 6:
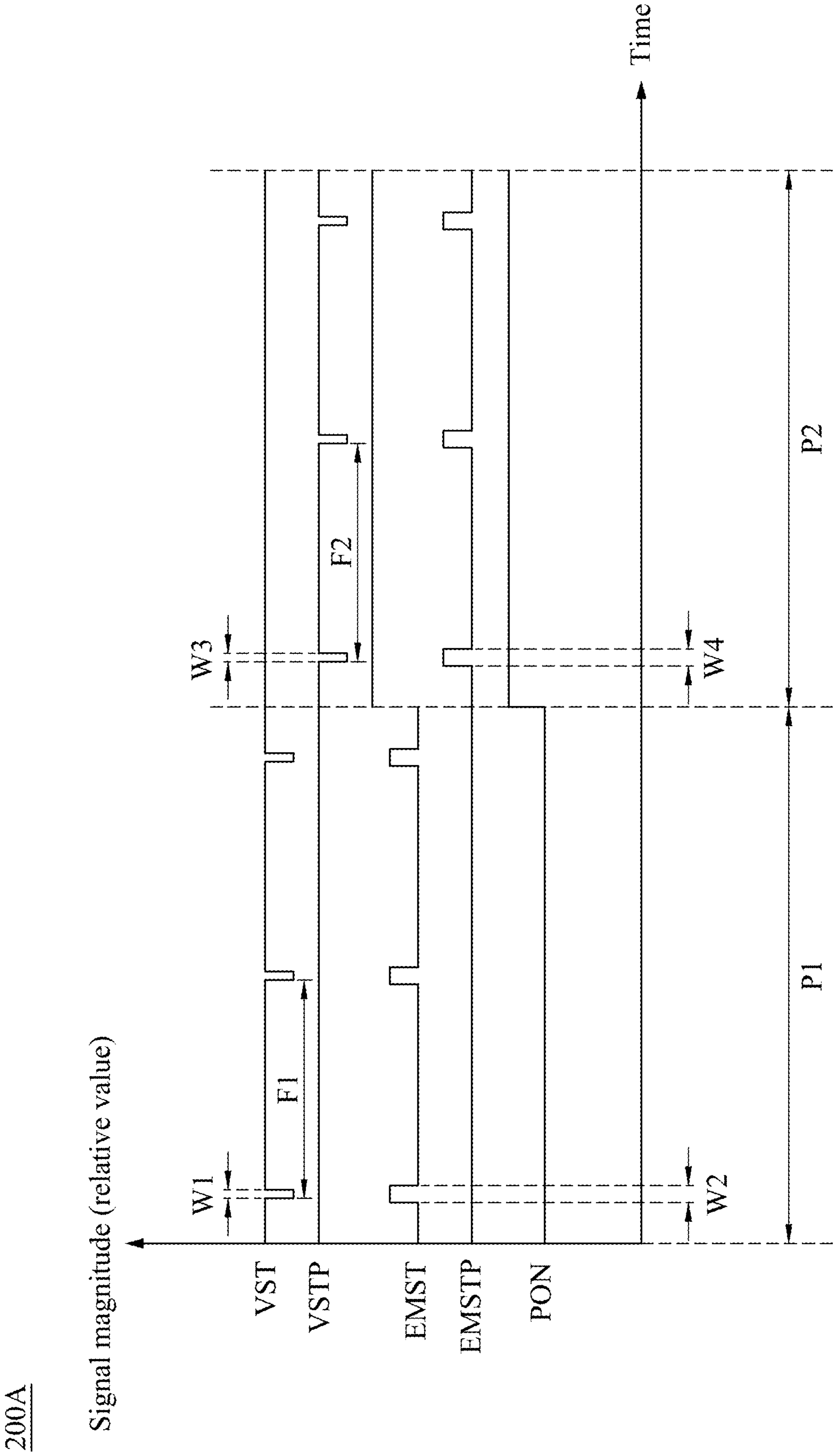
FIG. 6 illustrates a timing diagram of multiple signals of a display driving device according to an embodiment of the present disclosure.

FIG. 6 illustrates a timing diagram of a plurality of signals of a display driving device according to an embodiment of the present case. As shown in FIG. 6, in some embodiments, the timing diagram 200A includes a driving signal VST, a driving partial signal VSTP, a light-emitting activation signal EMST, a light-emitting partial signal EMSTP, a control signal PON, a period P1, and a period P2.

For example, the driving signal VST, the driving partial signal VSTP, the light-emitting activation signal EMST, the light-emitting partial signal EMSTP, and the control signal PON in FIG. 6 may each correspond to the driving signal VST, the driving partial signal VSTP, the light-emitting activation signal EMST, the light-emitting partial signal EMSTP, and the control signal PON in FIGS. 5A to 5D, but the present disclosure is not limited thereto.

In some embodiments, the signal timing and operation of the timing diagram 200A in FIG. 6 are similar to the signal timing and operation of the timing diagram 200 in FIG. 4. To simplify the description, other operations of the fourth driving circuit 150A are omitted here.

It should be noted that during period P1, the control signal PON has a low-level signal. During period P2, the control signal PON has a high-level signal.

In some embodiments, please refer to FIGS. 1, 4, and 6 together. When the voltage level of the control signal PON is at a high voltage level, the display 110 may perform a partial screen update (i.e., the partial update is enable). When the voltage level of the control signal PON is at a low voltage level, the display 110 disables the partial update (i.e., the display 110 performs a full-screen update or performs no partial screen update).

Figure 7:
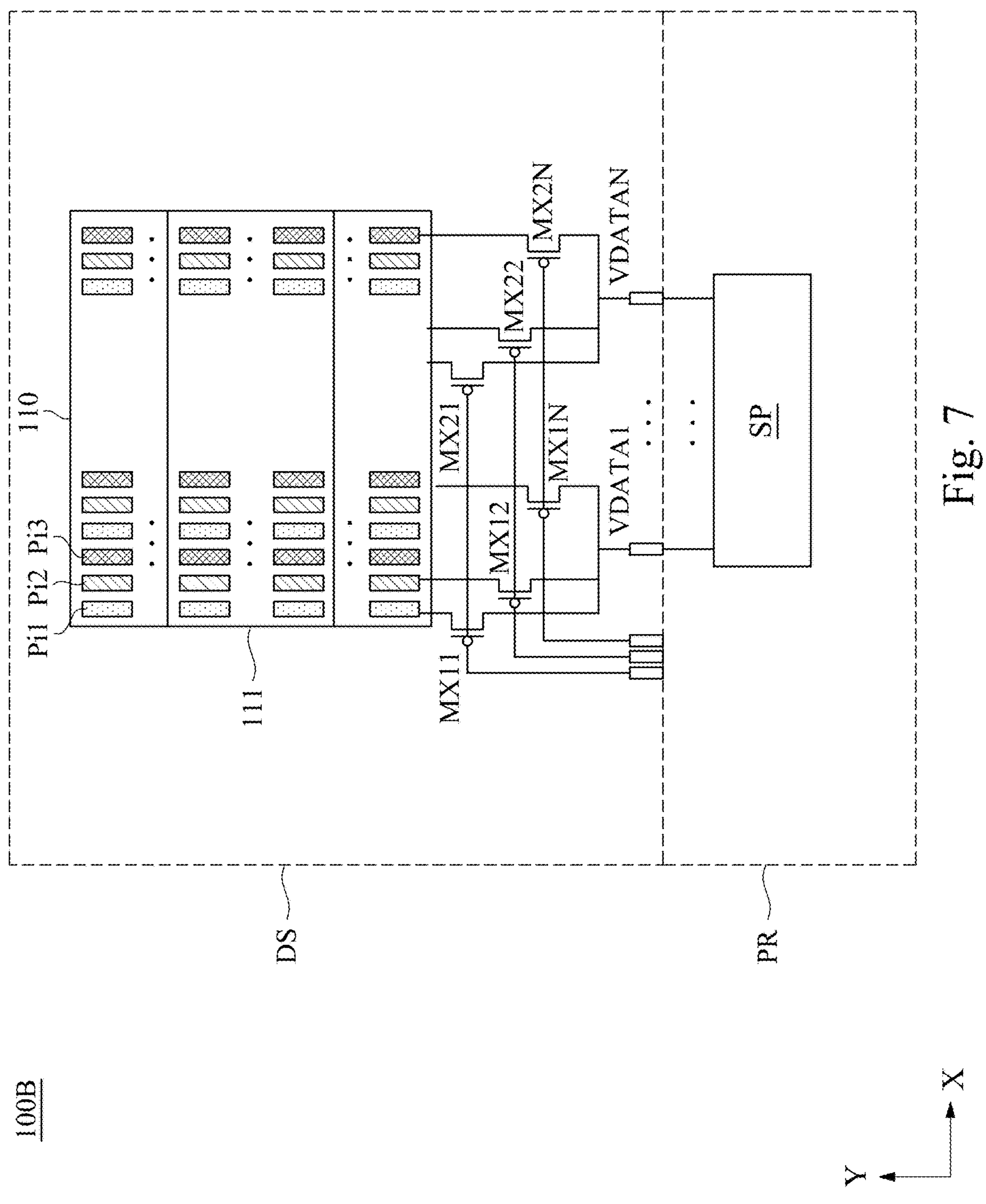
FIG. 7 illustrates an operation scenario diagram of a display driving device according to an embodiment of the present disclosure.

FIG. 7 illustrates an operation scenario of a display driving device according to an embodiment of the present case. As shown in FIG. 7, in some embodiments, the display driving device 100B includes a panel DS and a driver chip PR. The panel DS includes a display 110, an update area 111, a plurality of red pixels Pi1, a plurality of green pixels Pi2, a plurality of blue pixels Pi3, N switches MX11 to MX1N, and N switches MX21 to MX2N. The driver chip PR includes a data signal generator SP.

For example, the display 110 may be considered as a light-emitting area, the red pixels Pi1 may be pixel areas with red LEDs, the green pixels Pi2 may be pixel areas with green LEDs, the blue pixels Pi3 may be pixel areas with blue LEDs, and N may be a positive integer greater than 0, but the present disclosure is not limited thereto.

In some embodiments, the driver chip PR may be a chip or an integrated circuit (IC), but the present disclosure is not limited thereto. In some embodiments, the driver chip PR may be a time controller (TCON), but the present disclosure is not limited thereto. In some embodiments, it may be an integrated device of a single processor or a plurality of microprocessors, such as a central processing unit (CPU), a graphics processing unit (GPU), or an application-specific integrated circuit (ASIC), etc., but the present disclosure is not limited thereto.

In some embodiments, the data signal generator SP is configured to output a plurality of data signals VDATA1 to VDATAN.

For example, a plurality of data signals VDATA1 to VDATAN may all be constant voltage level signals, but the present disclosure is not limited thereto.

In some embodiments, the multiplexer includes N switches MX11 to MX1N and N switches MX21 to MX2N.

For example, the multiplexer may be a data selector or a multiplexer (MUX), the N switches MX11 to MX1N may all be P-type transistors or N-type transistors, and the N switches MX21 to MX2N may all be P-type transistors or N-type transistors, but the present disclosure is not limited thereto.

In some embodiments, the data signal generator SP is configured to output N data signals VDATA1 to VDATAN. The multiplexer may receive and individually output one of the N data signals VDATA1 to VDATAN.

In some embodiments, the update area 111 of the display 110 may be a partial update area, and the area of the display 110 other than the update area 111 may be a no update area, but the present disclosure is not limited thereto.

In some embodiments, the multiplexer may be coupled to a plurality of red pixels Pi1, a plurality of green pixels Pi2, and a plurality of blue pixels Pi3 of the update area 111. In some embodiments, the multiplexer may be coupled to the red pixels Pi1, green pixels Pi2, and blue pixels Pi3 of the no update area.

Figure 8:
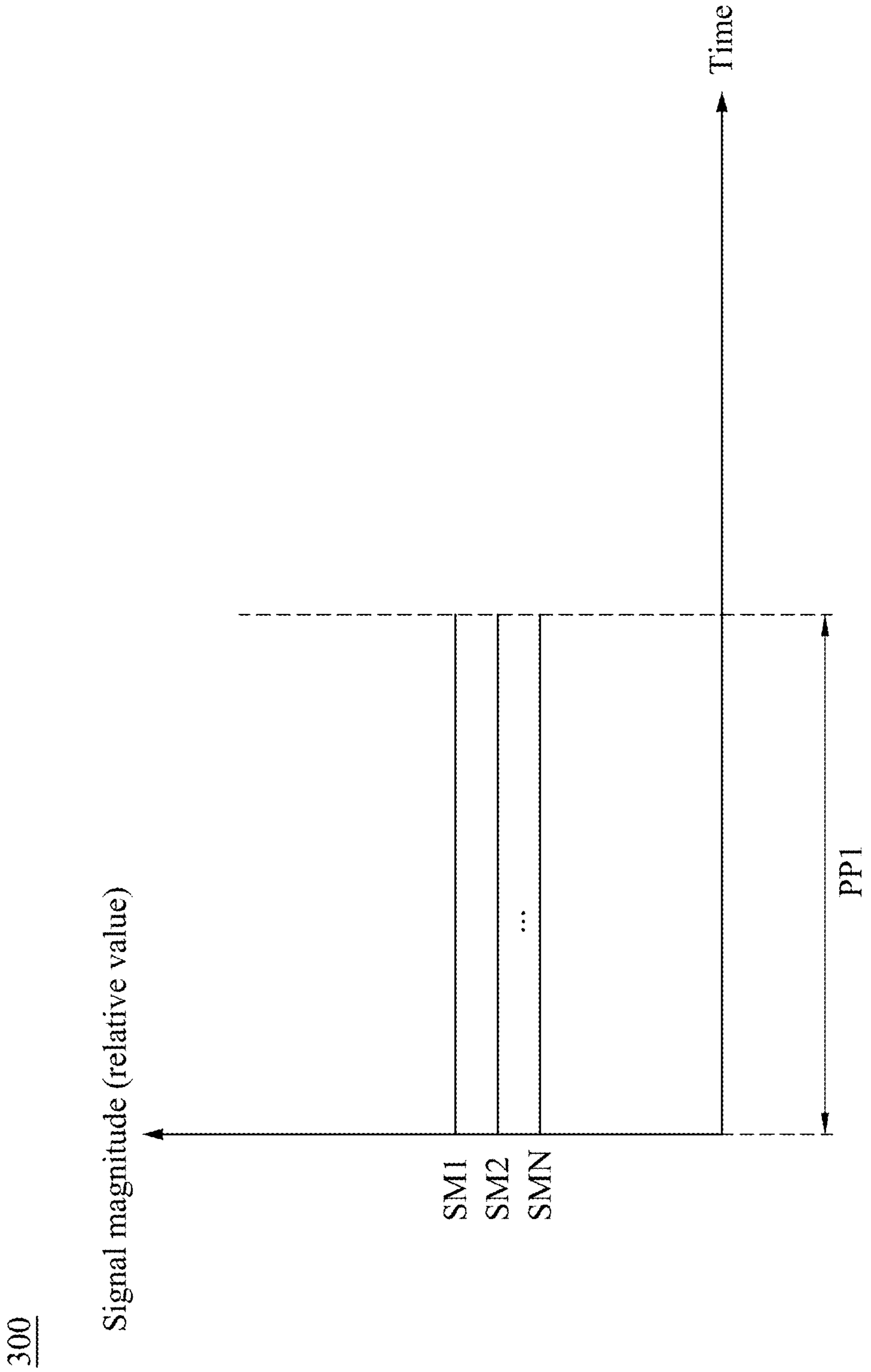
FIG. 8 illustrates a timing diagram of multiple signals of a display driving device according to an embodiment of the present disclosure.

FIG. 8 illustrates a timing diagram of multiple signals of a display driving device according to an embodiment of the present case. As shown in FIG. 8, in some embodiments, the timing diagram 300 includes N switching signals SM1 to SMN.

For example, during period PP1, the N switching signals SM1 to SMN may each be a high-level signal, such as 5 V for the switching signal SM1, but the present disclosure is not limited thereto.

In some embodiments, the N switching signals SM1 to SMN may each be a floating signal, but the present disclosure is not limited thereto.

In some embodiments, the length of period PP1 may be one frame, but the present disclosure is not limited thereto.

Please refer to FIGS. 7 and 8 together. In some embodiments, the switch MX11 corresponds to receiving the switching signal SM1, the switch MX21 corresponds to receiving the switching signal SM1, the switch MX12 corresponds to receiving the switching signal SM2, the switch MX22 corresponds to receiving the switching signal SM2, the switch MX1N corresponds to receiving the switching signal SMN, and the switch MX2N corresponds to receiving the switching signal SMN, but the present disclosure is not limited thereto.

In some embodiments, for the non-update area of the display 110, the N switching signals SM1 to SMN received by the multiplexer may each be a high-level signal. At this time, the multiplexer may be considered closed and stop outputting the N data signals VDATA1 to VDATAN.

Figure 9:
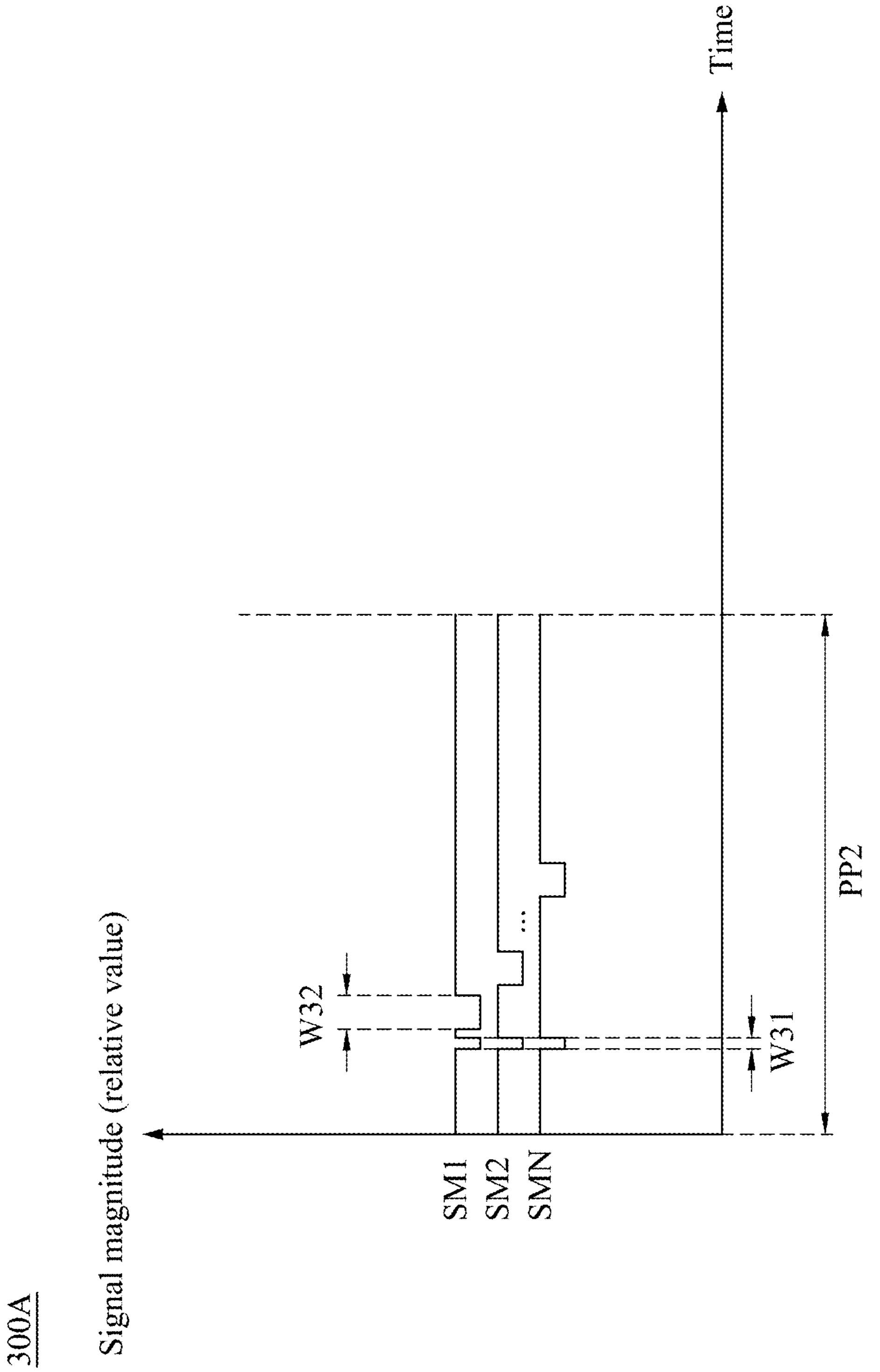
FIG. 9 illustrates a timing diagram of multiple signals of a display driving device according to an embodiment of the present disclosure.

FIG. 9 illustrates a timing diagram of multiple signals of a display driving device according to an embodiment of the present case. As shown in FIG. 9, in some embodiments, the timing diagram 300A includes N switching signals SM1 to SMN.

For example, during period PP1, the N switching signals SM1 to SMN may each have a pre-charge pulse signal and a pulse signal. For instance, the switching signal SM1 may have a pre-charge pulse signal and a pulse signal, with the pre-charge pulse signal preceding the pulse signal, but the present disclosure is not limited thereto.

In some embodiments, the pre-charge pulse signal of the switching signal SM1 has a pulse width W31, the pre-charge pulse signal of the switching signal SM2 has a pulse width W31, and the pre-charge pulse signal of the switching signal SMN has a pulse width W31. The pulse signal of the switching signal SM1 has a pulse width W32, the pulse signal of the switching signal SM2 has a pulse width W32, and the pulse signal of the switching signal SMN has a pulse width W32.

For example, the length of the pulse width W32 may be greater than the length of the pulse width W31. For instance, one pulse width W32 may be three times the pulse width W31, but the present disclosure is not limited thereto.

In some embodiments, the length of period PP2 may be one frame, but the present disclosure is not limited thereto.

Please refer to FIGS. 7 and 9 together. In some embodiments, the switch MX11 corresponds to receiving the switching signal SM1, the switch MX21 corresponds to receiving the switching signal SM1, the switch MX12 corresponds to receiving the switching signal SM2, the switch MX22 corresponds to receiving the switching signal SM2, the switch MX1N corresponds to receiving the switching signal SMN, and the switch MX2N corresponds to receiving the switching signal SMN, but the present disclosure is not limited thereto.

In some embodiments, for the update area 111 of the display 110, the multiplexer receives the N switching signals SM1 to SMN to respectively output the N data signals VDATA1 to VDATAN to the multiple red pixels Pi1, multiple green pixels Pi2, and multiple blue pixels Pi3 in the update area 111.

In some embodiments, the update area 111 of the display 110 may sequentially display a red screen, a green screen, and a blue screen.

In some embodiments, the display driving device 100B further includes a multiplexer. The multiplexer includes a first switch MX11 and a second switch MX21. The first switch MX11 is configured to output a data signal VDATA1 to the light-emitting area based on the switching signal SM1. The second switch MX21 is configured to output a data signal VDATAN to the light-emitting area based on the switching signal SM1. The light-emitting area includes the update area 111.

In some embodiments, in general, a panel or display may only perform a full update of the display. Every time the screen is updated, all screens of the display are updated together, which may easily lead to power consumption. For example, when a display is used in a smartwatch, reducing the power consumption of the watch becomes a challenge to achieve longer battery life.

In the present disclosure, the panel or display may perform the partial update for the display. For example, the update area 111 of the display 110 may occupy 0-50% of the total area of the display 110. When the display in the present disclosure performs the partial update, compared to a general display, the display in the present disclosure may save about 20-60% of power consumption, achieving effective power savings.

Figure 10A:
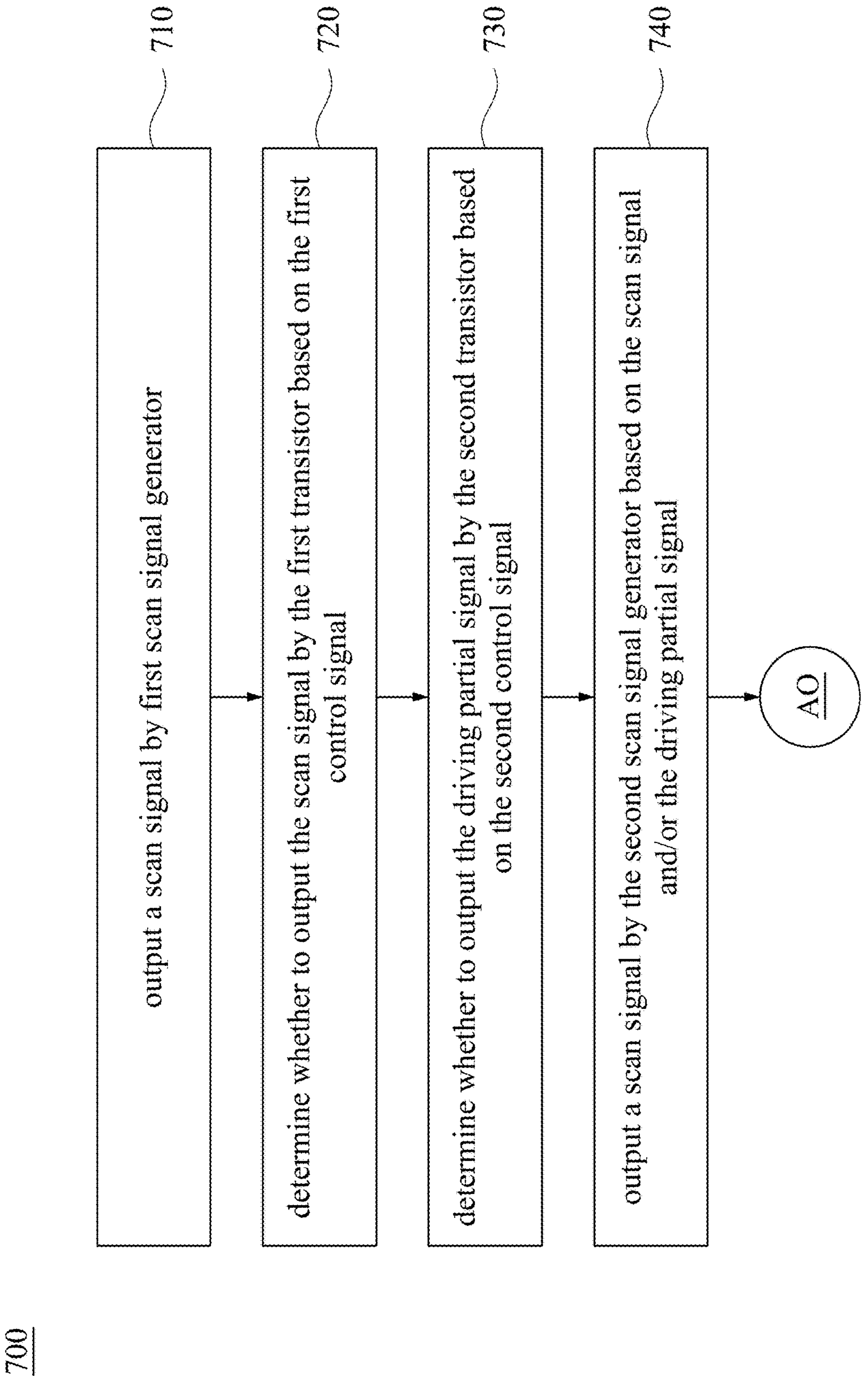
FIG. 10A illustrates a flowchart of a display driving method according to an embodiment of the present disclosure.
Figure 10B:
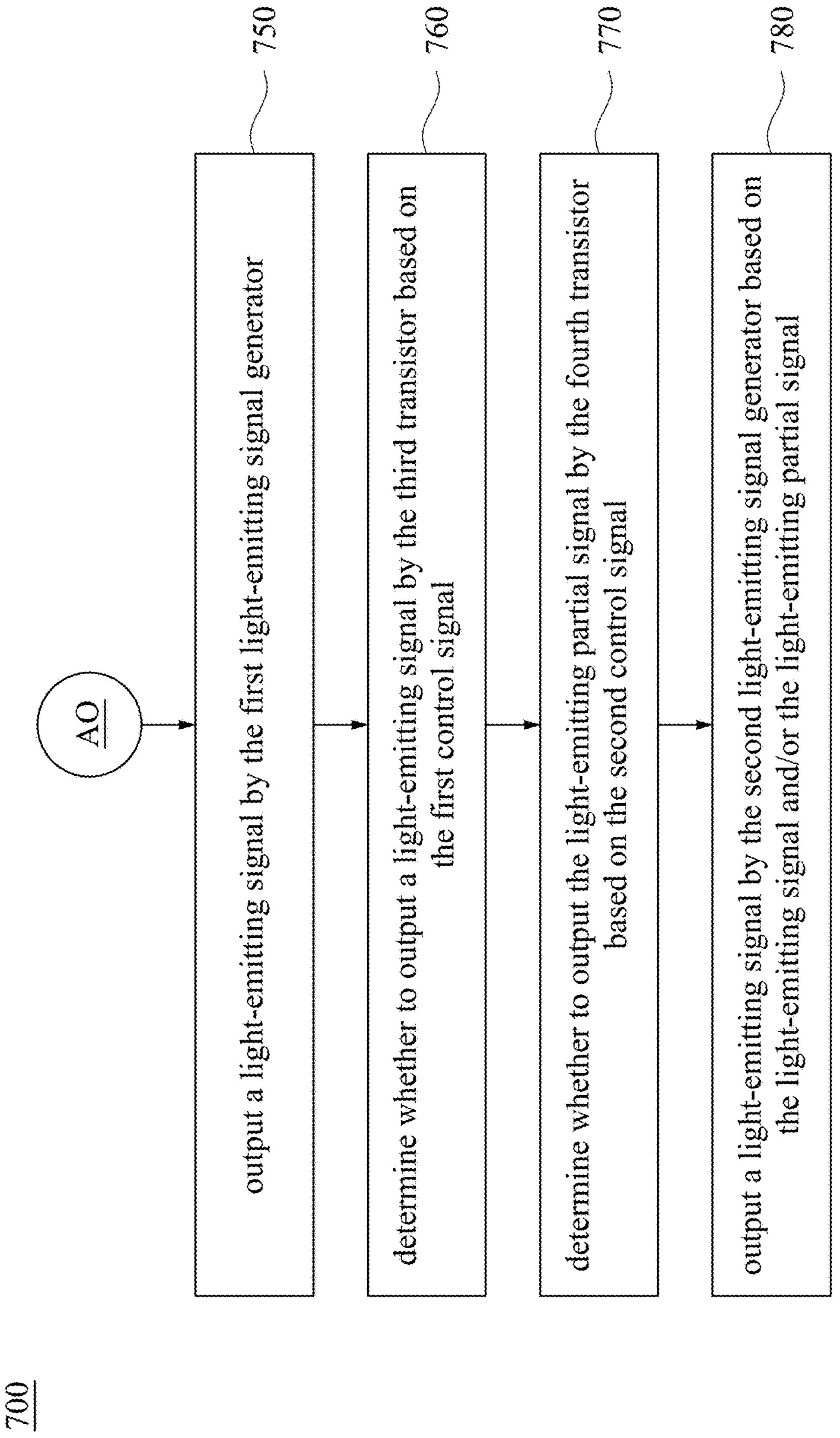
FIG. 10B illustrates a flowchart of a display driving method according to an embodiment of the present disclosure.

FIG. 10A illustrates a flowchart of steps of a display driving method according to an embodiment of the present case. FIG. 10B illustrates a flowchart of steps of a display driving method according to an embodiment of the present case. As shown in FIGS. 10A and 10B, in one embodiment, the display driving method 700 includes steps 710 to 780, with detailed descriptions of steps 710 to 780 as follows.

In step 710, a scan signal is output by the first scan signal generator.

In one embodiment, please refer to FIGS. 1 to 4, 10A, and 10B together. The scan signal S2[N] may be output by the first scan signal generator GSA (as shown in FIG. 3A).

For example, the operation of the display driving device 100 is similar to the operation of the display driving method 700. To simplify the description, other operations of the display driving method 700 are omitted here.

In step 720, it is determined whether to output the scan signal by the first transistor based on the first control signal.

In one embodiment, please refer to FIGS. 1 to 4, 10A, and 10B together. It may be determined whether to output the scan signal S2[N] by the first control terminal of the first transistor T1 based on the first control signal PSW.

For example, the operation of the display driving device 100 is similar to the operation of the display driving method 700. To simplify the description, other operations of the display driving method 700 are omitted here.

In step 730, it is determined whether to output the driving partial signal by the second transistor based on the second control signal.

In one embodiment, please refer to FIGS. 1 to 4, 10A, and 10B together. It may be determined whether to output the driving partial signal VSTP by the second control terminal of the second transistor T2 based on the second control signal PON.

For example, the operation of the display driving device 100 is similar to the operation of the display driving method 700. To simplify the description, other operations of the display driving method 700 are omitted here.

In step 740, a scan signal is output by the second scan signal generator based on the scan signal and/or the driving partial signal.

In one embodiment, please refer to FIGS. 1 to 4, 10A, and 10B together. The scan signal S2[N] or S2[N−1] may be output by the second scan signal generator GSB based on the scan signal S2[N] and/or the driving partial signal VSTP.

For example, the operation of the display driving device 100 is similar to the operation of the display driving method 700. To simplify the description, other operations of the display driving method 700 are omitted here.

In step 750, a light-emitting signal is output by the first light-emitting signal generator.

In one embodiment, please refer to FIGS. 1 to 4, 10A, and 10B together. The light-emitting signal EM[N] may be output by the first light-emitting signal generator GEMA (as shown in FIG. 3B).

For example, the operation of the display driving device 100 is similar to the operation of the display driving method 700. To simplify the description, other operations of the display driving method 700 are omitted here.

In step 760, it is determined whether to output the light-emitting signal by the third transistor based on the first control signal.

In one embodiment, please refer to FIGS. 1 to 4, 10A, and 10B together. It may be determined whether to output the light-emitting signal EM[N] by the third control terminal of the third transistor T3 based on the first control signal PSW.

For example, the operation of the display driving device 100 is similar to the operation of the display driving method 700. To simplify the description, other operations of the display driving method 700 are omitted here.

In step 770, it is determined whether to output the light-emitting partial signal by the fourth transistor based on the second control signal.

In one embodiment, please refer to FIGS. 1 to 4, 10A, and 10B together. It may be determined whether to output the light-emitting partial signal EMSTP by the fourth control terminal of the fourth transistor T4 based on the second control signal PON.

For example, the operation of the display driving device 100 is similar to the operation of the display driving method 700. To simplify the description, other operations of the display driving method 700 are omitted here.

In step 780, a light-emitting signal is output by the second light-emitting signal generator based on the light-emitting signal and/or the light-emitting partial signal.

In one embodiment, the first driving circuit 120 is coupled to the update area 111, and the second driving circuit 130 is coupled to the update area 111. The first driving circuit 120 includes the first scan signal generator GSA, the first transistor T1, the second transistor T2, and the second scan signal generator GSB. The second driving circuit 130 includes the first light-emitting signal generator GEMA, the third transistor T3, the fourth transistor T4, and the second light-emitting signal generator GEMB. The first driving circuit 120 is located on the first side of the update area 111, and the second driving circuit 130 is located on the second side of the update area 111, with the first side and the second side being different sides from each other.

In some embodiments, there is a step AO between step 740 and step 750. This step AO may be ignored and is only configured to connect step 740 and step 750 without any special meaning, but the present disclosure is not limited thereto.

In one embodiment, please refer to FIGS. 1 to 4, 10A, and 10B together. The light-emitting signal EM[N] or EM[N−1] may be output by the second light-emitting signal generator GEMB based on the light-emitting signal EM[N] and/or the light-emitting partial signal EMSTP.

For example, the operation of the display driving device 100 is similar to the operation of the display driving method 700. To simplify the description, other operations of the display driving method 700 are omitted here.

In one embodiment, please refer to FIGS. 1 to 4, 10A, and 10B together. The display driving method 700 further includes the following steps: outputting the scan signal S2[N] by the third scan signal generator GSC; determining whether to output the scan signal S2[N] by the fifth transistor T5 based on the first control signal PSW; determining whether to output the driving signal VST by the sixth transistor T6 based on the second control signal PON; and outputting the scan signal S2[N] or S2[N−1] by the fourth scan signal generator GSD based on the scan signal S2[N] and/or the driving signal VST. The third driving circuit 140 is coupled to the update area 111 and is located on the first side of the update area 111.

For example, the operation of the display driving device 100 is similar to the operation of the display driving method 700. To simplify the description, other operations of the display driving method 700 are omitted here.

In one embodiment, please refer to FIGS. 1 to 4, 10A, and 10B together. The display driving method 700 further includes the following steps: outputting the light-emitting signal EM[N] by the third light-emitting signal generator GEMC; determining whether to output the light-emitting signal EM[N] by the seventh transistor T7 based on the first control signal PSW; determining whether to output the light-emitting activation signal EMST by the eighth transistor T8 based on the second control signal PON; and outputting the light-emitting signal EM[N] or EM[N−1] by the fourth light-emitting signal generator GEMD based on the light-emitting signal EM[N] and/or the light-emitting activation signal EMST. The fourth driving circuit 150 is coupled to the update area 111 and is located on the second side of the update area 111.

For example, the operation of the display driving device 100 is similar to the operation of the display driving method 700. To simplify the description, other operations of the display driving method 700 are omitted here.

In one embodiment, please refer to FIGS. 1, 2, 5A, 5B, 10A, and 10B together. The first control terminal of the first transistor T1 (as shown in FIG. 5A) is coupled to the second control terminal of the second transistor T2. The third control terminal of the third transistor T3 (as shown in FIG. 5B) is coupled to the fourth control terminal of the fourth transistor T4. The first control signal PSW and the second control signal PON are the same.

For example, the operation of the display driving device 100 is similar to the operation of the display driving method 700. To simplify the description, other operations of the display driving method 700 are omitted here.

In one embodiment, please refer to FIGS. 1, 2, 7, 9, 10A, and 10B together. The display driving method 700 further includes the following steps: outputting the data signal VDATA1 to the light-emitting area by the first switch MX11 based on the switching signal SM1; and outputting the data signal VDATAN to the light-emitting area by the second switch MX21 based on the switching signal SM1. The multiplexer includes the first switch MX11 and the second switch MX21. The light-emitting area includes the update area.

From the above embodiments of the present case, it can be seen that the application of the present case has the following advantages. The display driving device and display driving method shown in the embodiments of the present case can achieve the effect of performing partial updates through multiple driving circuits.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A display driving device, comprising:
- an update area;
- a first driving circuit coupled to the update area and comprising:
  - a first scan signal generator for outputting a scan signal;
  - a first transistor, wherein a first terminal of the first transistor is coupled to the first scan signal generator and receives the scan signal, and a first control terminal of the first transistor is configured to determine whether to output the scan signal based on a first control signal;
  - a second transistor, wherein a second terminal of the second transistor is coupled to the first transistor, and a second control terminal of the second transistor is configured to determine whether to output a driving partial signal based on a second control signal; and
  - a second scan signal generator for receiving and outputting the scan signal based on the scan signal and/or the driving partial signal; and
- a second driving circuit coupled to the update area and comprising:
  - a first light-emitting signal generator for outputting a light-emitting signal;
  - a third transistor, wherein a third terminal of the third transistor is coupled to the first light-emitting signal generator and receives the light-emitting signal, and a third control terminal of the third transistor is configured to determine whether to output the light-emitting signal based on the first control signal;
  - a fourth transistor, wherein a fourth terminal of the fourth transistor is coupled to the third transistor, and a fourth control terminal of the fourth transistor is configured to determine whether to output a light-emitting partial signal based on the second control signal; and
  - a second light-emitting signal generator for receiving and outputting the light-emitting signal based on the light-emitting signal and/or the light-emitting partial signal;
- wherein the first driving circuit is located on a first side of the update area, the second driving circuit is located on a second side of the update area, and the first side and the second side are different sides.

2. The display driving device of claim 1, further comprising:
- a third driving circuit coupled to the update area and comprising:

a third scan signal generator for outputting the scan signal;

a fifth transistor, wherein a fifth terminal of the fifth transistor is coupled to the third scan signal generator and receives the scan signal, and a fifth control terminal of the fifth transistor is configured to determine whether to output the scan signal based on the first control signal;

a sixth transistor, wherein a sixth terminal of the sixth transistor is coupled to the fifth transistor, and a sixth control terminal of the sixth transistor is configured to determine whether to output a driving signal based on the second control signal; and a fourth scan signal generator for receiving and outputting the scan signal based on the scan signal and/or the driving signal.

3. The display driving device of claim 2, wherein the third driving circuit is located on the first side of the update area.

4. The display driving device of claim 2, further comprising:

a fourth driving circuit coupled to the update area and comprising:

a third light-emitting signal generator for outputting the light-emitting signal;

a seventh transistor, wherein a seventh terminal of the seventh transistor is coupled to the third light-emitting signal generator and receives the light-emitting signal, and a seventh control terminal of the seventh transistor is configured to determine whether to output the light-emitting signal based on the first control signal;

an eighth transistor, wherein an eighth terminal of the eighth transistor is coupled to the seventh transistor, and an eighth control terminal of the eighth transistor is configured to determine whether to output a light-emitting activation signal based on the second control signal; and a fourth light-emitting signal generator for receiving and outputting the light-emitting signal based on the light-emitting signal and/or the light-emitting activation signal.

5. The display driving device of claim 4, wherein the fourth driving circuit is located on the second side of the update area.

6. The display driving device of claim 1, wherein the first control terminal and the second control terminal are coupled to each other;

wherein the third control terminal and the fourth control terminal are coupled to each other.

7. The display driving device of claim 6, wherein the first control signal and the second control signal are identical.

8. The display driving device of claim 1, further comprising:

a multiplexer, comprising:

a first switch for outputting a first data signal to a light-emitting area based on a first switching signal; and a second switch for outputting a second data signal to the light-emitting area based on the first switching signal;

wherein the light-emitting area includes the update area.

9. A display driving method, comprising:

outputting a scan signal by a first scan signal generator;

determining whether to output the scan signal by a first transistor based on a first control signal;

determining whether to output a driving partial signal by a second transistor based on a second control signal;

outputting the scan signal by a second scan signal generator based on the scan signal and/or the driving partial signal;

outputting a light-emitting signal by a first light-emitting signal generator;

determining whether to output the light-emitting signal by a third transistor based on the first control signal;

determining whether to output a light-emitting partial signal by a fourth transistor based on the second control signal; and outputting the light-emitting signal by a second light-emitting signal generator based on the light-emitting signal and/or the light-emitting partial signal;

wherein a first driving circuit is coupled to an update area, and a second driving circuit is coupled to the update area;

wherein the first driving circuit comprises the first scan signal generator, the first transistor, the second transistor, and the second scan signal generator;

wherein the second driving circuit comprises the first light-emitting signal generator, the third transistor, the fourth transistor, and the second light-emitting signal generator;

wherein the first driving circuit is located on a first side of the update area, the second driving circuit is located on a second side of the update area, and the first side and the second side are different sides.

10. The display driving method of claim 9, further comprising:

outputting the scan signal by a third scan signal generator;

determining whether to output the scan signal by a fifth transistor based on the first control signal;

determining whether to output a driving signal by a sixth transistor based on the second control signal; and outputting the scan signal by a fourth scan signal generator based on the scan signal and/or the driving signal;

wherein a third driving circuit is coupled to the update area.

11. The display driving method of claim 10, wherein the third driving circuit is located on the first side of the update area.

12. The display driving method of claim 10, further comprising:

outputting the light-emitting signal by a third light-emitting signal generator;

determining whether to output the light-emitting signal by a seventh transistor based on the first control signal;

determining whether to output a light-emitting activation signal by an eighth transistor based on the second control signal; and outputting the light-emitting signal by a fourth light-emitting signal generator based on the light-emitting signal and/or the light-emitting activation signal;

wherein a fourth driving circuit is coupled to the update area.

13. The display driving method of claim 12, wherein the fourth driving circuit is located on the second side of the update area.

14. The display driving method of claim 9, wherein a first control terminal of the first transistor and a second control terminal of the second transistor are coupled to each other;

wherein a third control terminal of the third transistor and a fourth control terminal of the fourth transistor are coupled to each other.

15. The display driving method of claim 14, wherein the first control signal and the second control signal are identical.

16. The display driving method of claim 9, further comprising:

outputting a first data signal to a light-emitting area by a first switch based on a first switching signal; and outputting a second data signal to the light-emitting area by a second switch based on the first switching signal;

wherein a multiplexer includes the first switch and the second switch;

wherein the light-emitting area includes the update area.

* * * * *